(12) United States Patent
Papasakellariou

(10) Patent No.: US 10,305,623 B2
(45) Date of Patent: May 28, 2019

(54) RESOURCE ALLOCATION FOR REPETITIONS OF TRANSMISSIONS IN A COMMUNICATION SYSTEM

(71) Applicant: Samsung Electronics Co., Ltd, Suwon-si (KR)

(72) Inventor: Aris Papasakellariou, Houston, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/886,691

(22) Filed: Feb. 1, 2018

(65) Prior Publication Data

US 2018/0159655 A1    Jun. 7, 2018

Related U.S. Application Data

(63) Continuation of application No. 15/063,148, filed on Mar. 7, 2016, now Pat. No. 9,887,801.

(Continued)

(51) Int. Cl.
| | |
|---|---|
| *H04W 72/04* | (2009.01) |
| *H04B 1/69* | (2011.01) |
| *H04L 5/00* | (2006.01) |
| *H04L 1/00* | (2006.01) |
| *H04L 1/16* | (2006.01) |
| *H04B 1/713* | (2011.01) |

(52) U.S. Cl.
CPC .............. *H04L 1/00* (2013.01); *H04L 5/003* (2013.01); *H04L 5/0053* (2013.01); *H04B 1/713* (2013.01); *H04B 2001/6908* (2013.01); *H04L 1/1671* (2013.01); *H04L 5/005* (2013.01); *H04L 5/0044* (2013.01); *H04L 5/0051* (2013.01); *H04L 5/0055* (2013.01); *H04W 72/0406* (2013.01)

(58) Field of Classification Search
CPC .......... H04W 72/0406; H04W 72/0446; H04L 5/003; H04L 5/0053; H04L 5/0044; H04L 5/005; H04L 5/0051; H04L 5/0055; H04L 1/00; H04L 1/1671; H04B 1/713; H04B 2001/6908

See application file for complete search history.

(56) References Cited

U.S. PATENT DOCUMENTS

| | | | |
|---|---|---|---|
| 9,887,801 B2 * | 2/2018 | Papasakellariou | ........ H04L 1/00 |
| 9,986,558 B2 | 5/2018 | Fang et al. | |

(Continued)

FOREIGN PATENT DOCUMENTS

| | | |
|---|---|---|
| WO | 2014/121489 A1 | 8/2014 |
| WO | 2014/166447 A1 | 10/2014 |

OTHER PUBLICATIONS

"3rd Generation Partnership Project; Technical Specification Group Radio Access Network; Study on provision of low-cost MTC UEs based on LTE; (Release 12)", 3GPP TR 36.888 v2.1.0, May 2013, 58 pages.

(Continued)

*Primary Examiner* — Afsar M Qureshi

(57) ABSTRACT

Methods and apparatus are provided to define sub-bands within a downlink (DL) system bandwidth or within an uplink (UL) system bandwidth, to configure sub-bands for DL signaling or for UL signaling, and to transmit or receive DL signaling or UL signaling with repetitions in the configured sub-bands.

28 Claims, 11 Drawing Sheets

Related U.S. Application Data

(60) Provisional application No. 62/131,629, filed on Mar. 11, 2015, provisional application No. 62/201,172, filed on Aug. 5, 2015, provisional application No. 62/207,439, filed on Aug. 20, 2015, provisional application No. 62/246,852, filed on Oct. 27, 2015.

(56) References Cited

U.S. PATENT DOCUMENTS

| | | | |
|---|---|---|---|
| 10,064,064 B2* | 8/2018 | Han | H04W 16/14 |
| 2011/0235743 A1* | 9/2011 | Lee | H04L 5/0048 |
| | | | 375/295 |
| 2013/0077582 A1* | 3/2013 | Kim | H04W 74/006 |
| | | | 370/329 |
| 2013/0308504 A1* | 11/2013 | Ninnbalker | H04L 5/001 |
| | | | 370/281 |
| 2015/0098420 A1 | 4/2015 | Luo et al. | |
| 2015/0230064 A1* | 8/2015 | Cho | H04W 4/06 |
| | | | 370/312 |
| 2015/0341960 A1 | 11/2015 | Quan et al. | |
| 2016/0183231 A1* | 6/2016 | Shi | H04W 72/0446 |
| | | | 370/329 |
| 2016/0192348 A1 | 6/2016 | Dai et al. | |
| 2016/0353420 A1* | 12/2016 | You | H04L 5/0053 |
| 2017/0374570 A1* | 12/2017 | Yi | H04L 1/00 |
| 2018/0159655 A1* | 6/2018 | Papasakellariou | H04L 1/00 |
| 2018/0167247 A1* | 6/2018 | Ma | H04L 25/0226 |
| 2018/0376479 A1* | 12/2018 | Kaur | H04W 72/0453 |

OTHER PUBLICATIONS

LG Electronics, "PDSCH related issues for MTC", 3GPP TSG RAN WG1 Meeting #80, Feb. 9-13, 2015, 8 pages, R1-150200.

Samsung, "Considerations of sub-band scheduling for 1.4 MHz MTC UE", 3GPP TSG RAN WG1 Meeting #80, Feb. 9-13, 2015, 3 pages, R1-150351.

European Search Report dated Jun. 6, 2018 in connection with European Patent Application No. 18 16 7572.

Notice of Allowance regarding U.S. Appl. No. 15/063,148, dated Sep. 28, 2017, 10 pages.

* cited by examiner

RESOURCE ALLOCATION FOR REPETITIONS OF TRANSMISSIONS IN A COMMUNICATION SYSTEM

CROSS-REFERENCE TO RELATED APPLICATION AND CLAIM OF PRIORITY

The present application is a continuation of U.S. application Ser. No. 15/063,148, filed Mar. 7, 2016, entitled "RESOURCE ALLOCATION FOR REPETITIONS OF TRANSMISSIONS IN A COMMUNICATION SYSTEM", now U.S. Pat. No. 9,887,801, which claims priority under 35 U.S.C. § 119(e) to: U.S. Provisional Patent Application Ser. No. 62/131,629 filed Mar. 11, 2015, entitled "RESOURCE ALLOCATION FOR REPETITIONS OF TRANSMISSIONS IN A COMMUNICATION SYSTEM;" U.S. Provisional Patent Application Ser. No. 62/201,172 filed Aug. 5, 2015, entitled "RESOURCE ALLOCATION FOR REPETITIONS OF TRANSMISSIONS IN A COMMUNICATION SYSTEM;" U.S. Provisional Patent Application Ser. No. 62/207,439 filed Aug. 20, 2015, entitled "RESOURCE ALLOCATION FOR REPETITIONS OF TRANSMISSIONS IN A COMMUNICATION SYSTEM;" and U.S. Provisional Patent Application Ser. No. 62/246,852 filed Oct. 27, 2015, entitled "RESOURCE ALLOCATION FOR REPETITIONS OF TRANSMISSIONS IN A COMMUNICATION SYSTEM." The contents of the above-identified patent documents are incorporated herein by reference.

TECHNICAL FIELD

The present application relates generally to wireless communications and, more specifically, to determining resources for repetitions of channels transmissions to low cost user equipments (UEs).

BACKGROUND

Wireless communication has been one of the most successful innovations in modern history. Recently, the number of subscribers to wireless communication services exceeded five billion and continues to grow quickly. The demand of wireless data traffic is rapidly increasing due to the growing popularity among consumers and businesses of smart phones and other mobile data devices, such as tablets, "note pad" computers, net books, eBook readers, and machine type of devices. In order to meet the high growth in mobile data traffic and support new applications and deployments, improvements in radio interface efficiency and coverage is of paramount importance.

SUMMARY

This disclosure provides methods and apparatus to determining resources for repetitions, including no repetitions, of channels transmissions to low cost UEs.

In a first embodiment, a base station is provided. The base station includes a transmitter. The transmitter is configured to transmit, in a subframe and in a downlink (DL) system bandwidth that includes an even number of $M_{RB}^{DL}$ DL resource blocks (RBs) indexed in an ascending order, a physical DL control channel (PDCCH) or a physical DL shared channel (PDSCH) within a sub-band from a set of $N_{SB}^{DL}$ DL sub-bands (SBs). $N_{SB}^{DL} = \lfloor M_{RB}^{DL}/6 \rfloor$. Each SB in the set includes 6 RBs. The 6 RBs of a SB in the set s are not included in any other SB in the set. the SBs are indexed from 0 to $N_{SB}^{DL}-1$ in order of increasing RB index. $(M_{RB}^{DL} - \lfloor M_{RB}^{DL}/6 \rfloor \cdot 6)/2$ RBs with smallest indexes and $(M_{RB}^{DL} - \lfloor M_{RB}^{DL}/6 \rfloor \cdot 6)/2$ RBs with largest indexes are not included in any SB in the set where $\lfloor \ \rfloor$ is a floor function that rounds a number to an integer that is immediately smaller than the number.

In a second embodiment, a UE is provided. The user equipment includes a receiver. The receiver is configured to receive, in a subframe and in a DL system bandwidth that includes an even number of $M_{RB}^{DL}$ DL RBs indexed in an ascending order, a PDCCH or a PDSCH within a sub band from a set of $N_{SB}^{DL}$ DL SBs. $N_{SB}^{DL} = \lfloor M_{RB}^{DL}/6 \rfloor$. Each SB in the set includes 6 RBs. The 6 RBs of a SB in the set are not included in any other SB in the set. The SBs are indexed from 0 to $N_{SB}^{DL}-1$ in order of increasing RB index. $(M_{RB}^{DL} - \lfloor M_{RB}^{DL}/6 \rfloor \cdot 6)/2$ RBs with smallest indexes and $(M_{RB}^{DL} - \lfloor M_{RB}^{DL}/6 \rfloor \cdot 6)/2$ RBs with largest indexes are not included in any SB where $\lfloor \ \rfloor$ is a floor function that rounds a number to an integer that is immediately smaller than the number.

In a third embodiment, a base station is provided. The base station includes a transmitter. The transmitter is configured to transmit a number of repetitions for a PDSCH conveying a data transport block (TB). The number of repetitions is a multiple of four. The data TB is encoded using a first redundancy version in first four repetitions.

In a fourth embodiment, a UE is provided. The UE includes a receiver. The receiver is configured to receive a number of repetitions for PDSCH conveying a data transport block (TB). The number of repetitions is a multiple of four. The data TB is encoded using a first redundancy version in first four repetitions.

Before undertaking the DETAILED DESCRIPTION below, it can be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller can be implemented in hardware or a combination of hardware and software and/or firmware. The functionality associated with any particular controller can be centralized or distributed, whether locally or remotely. The phrase "at least one of," when used with a list of items, means that different combinations of one or more of the listed items can be used, and only one item in the list can be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this disclosure. Those of ordinary skill in the art should understand that in many when not most instances such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 19, discussed below, and the various embodiments used to describe the principles of the present disclosure in this patent document are by way of illustration only and should not be construed in any way to limit the scope of the disclosure. Those skilled in the art will understand that the principles of the present disclosure can be implemented in any suitably arranged wireless communication system.

The following documents and standards descriptions are hereby incorporated by reference into the present disclosure as when fully set forth herein: 3GPP TS 36.211 v12.4.0, "E-UTRA, Physical channels and modulation" (REF 1); 3GPP TS 36.212 v12.3.0, "E-UTRA, Multiplexing and Channel coding" (REF 2); 3GPP TS 36.213 v12.4.0, "E-UTRA, Physical Layer Procedures" (REF 3); 3GPP TS 36.321 v12.4.0, "E-UTRA, Medium Access Control (MAC) protocol specification" (REF 4); and 3GPP TS 36.331 v12.4.0, "E-UTRA, Radio Resource Control (RRC) Protocol Specification" (REF 5).

This disclosure relates to determining resources and to transmitting and receiving repetitions, including no repetitions, for transmissions of channels to or from UEs. A wireless communication network includes a DL that conveys signals from transmission points, such as base stations or enhanced eNBs, to UEs. The wireless communication network also includes an UL that conveys signals from UEs to reception points, such as eNBs.

Figure 1:
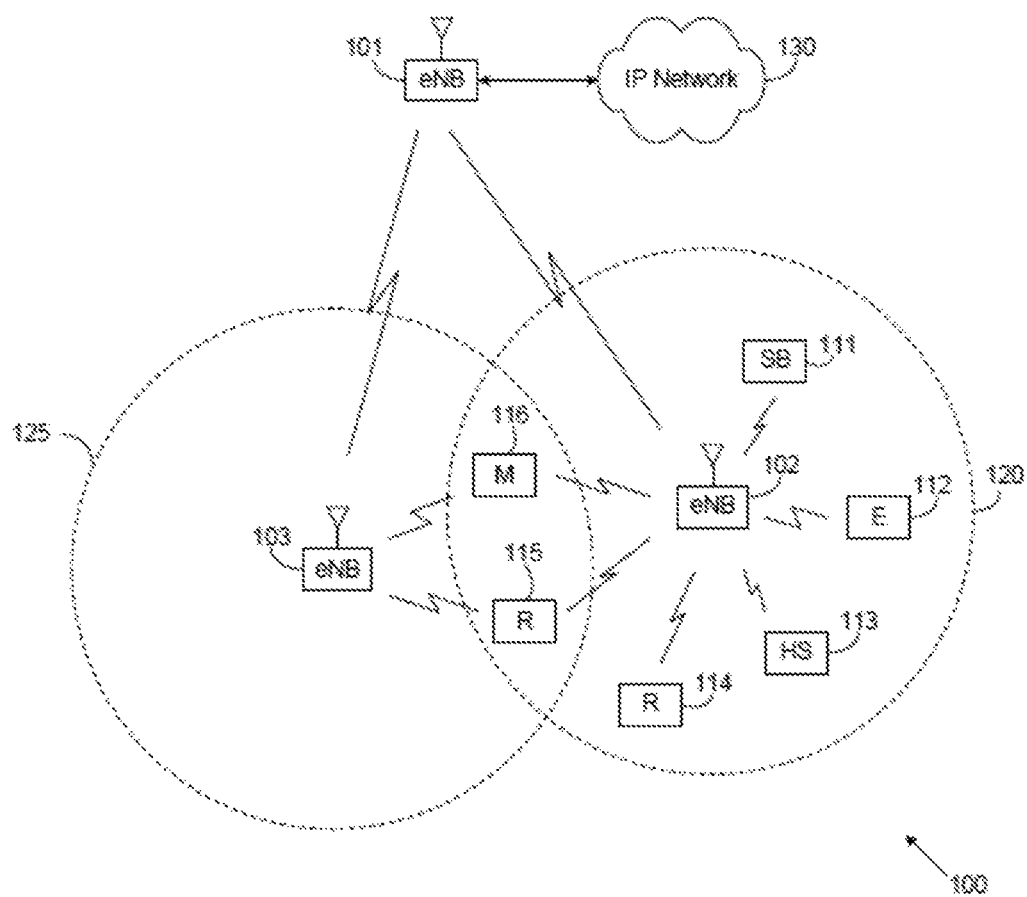
FIG. 1 illustrates an example wireless communication network according to this disclosure.

FIG. 1 illustrates an example wireless network 100 according to this disclosure. The embodiment of the wireless network 100 shown in FIG. 1 is for illustration only. Other embodiments of the wireless network 100 could be used without departing from the scope of this disclosure.

As shown in FIG. 1, the wireless network 100 includes an eNB 101, an eNB 102, and an eNB 103. The eNB 101 communicates with the eNB 102 and the eNB 103. The eNB 101 also communicates with at least one Internet Protocol (IP) network 130, such as the Internet, a proprietary IP network, or other data network.

Depending on the network type, other well-known terms can be used instead of "NodeB" or "eNB," such as "base station" or "access point." For the sake of convenience, the terms "NodeB" and "eNB" are used in this patent document to refer to network infrastructure components that provide wireless access to remote terminals. Also, depending on the network type, other well-known terms can be used instead of "user equipment" or "UE," such as "mobile station," "subscriber station," "remote terminal," "wireless terminal," or "user device." A UE, can be fixed or mobile and can be a cellular phone, a personal computer device, and the like. For the sake of convenience, the terms "user equipment" and "UE" are used in this patent document to refer to remote wireless equipment that wirelessly accesses an eNB, whether the UE is a mobile device (such as a mobile telephone or smart-phone) or is normally considered a stationary device (such as a desktop computer or vending machine).

The eNB 102 provides wireless broadband access to the network 130 for a first plurality of UEs within a coverage area 120 of the eNB 102. The first plurality of UEs includes a UE 111, which can be located in a small business (SBS); a UE 112, which can be located in an enterprise (E); a UE 113, which can be located in a WiFi hotspot (HS); a UE 114, which can be located in a first residence (R); a UE 115, which can be located in a second residence (R); and a UE 116, which can be a mobile device (M) like a cell phone, a wireless laptop, a wireless PDA, or the like. The eNB 103 provides wireless broadband access to the network 130 for a second plurality of UEs within a coverage area 125 of the eNB 103. The second plurality of UEs includes the UE 115 and the UE 116. In some embodiments, one or more of the eNBs 101-103 can communicate with each other and with the UEs 111-116 using 5G, LTE, LTE-A, WiMAX, or other advanced wireless communication techniques.

Dotted lines show the approximate extents of the coverage areas 120 and 125, which are shown as approximately circular for the purposes of illustration and explanation only. It should be clearly understood that the coverage areas associated with eNBs, such as the coverage areas 120 and 125, can have other shapes, including irregular shapes, depending upon the configuration of the eNBs and variations in the radio environment associated with natural and man-made obstructions.

As described in more detail below, various components of the network 100, such as the eNBs 101-103, support the adaptation of communication direction in the network 100, and can transmit and receive repetitions for transmissions of channels in order to communicate with one or more of UEs 111-116. In addition, one or more of UEs 111-116 are configured to support the adaptation of communication direction in the network 100, and to transmit and receive repetitions of channels transmissions for communication between one or more of eNBs 101-103 with one or more of UEs 111-116.

Although FIG. 1 illustrates one example of a wireless network 100, various changes can be made to FIG. 1. For example, the wireless network 100 could include any number of eNBs and any number of UEs in any suitable arrangement. Also, the eNB 101 could communicate directly with any number of UEs and provide those UEs with wireless broadband access to the network 130. Similarly, each eNB 102-103 could communicate directly with the network 130 and provide UEs with direct wireless broadband access to the network 130. Further, the eNB 101, 102, and/or 103 could provide access to other or additional external networks, such as external telephone networks or other types of data networks.

Figure 2:
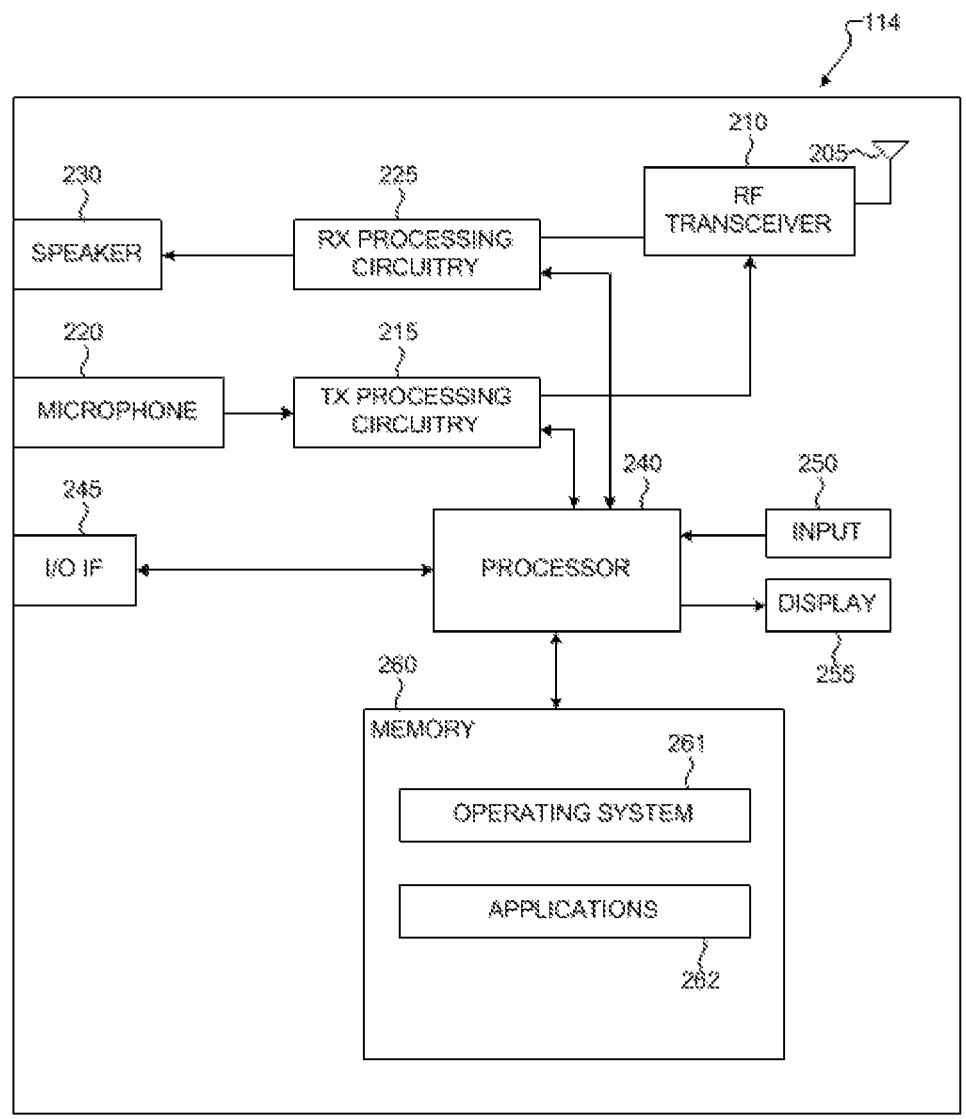
FIG. 2 illustrates an example UE according to this disclosure.

FIG. 2 illustrates an example UE 114 according to this disclosure. The embodiment of the UE 114 shown in FIG. 2 is for illustration only, and the other UEs in FIG. 1 could have the same or similar configuration. However, UEs come in a wide variety of configurations, and FIG. 2 does not limit the scope of this disclosure to any particular implementation of a UE.

As shown in FIG. 2, the UE 114 includes an antenna 205, a radio frequency (RF) transceiver 210, transmit (TX) processing circuitry 215, a microphone 220, and receive (RX) processing circuitry 225. The UE 114 also includes a speaker 230, a processor 240, an input/output (I/O) interface (IF) 245, a keypad 250, a display 255, and a memory 260. The memory 260 includes an operating system (OS) program 261 and one or more applications 262.

The RF transceiver 210 receives, from the antenna 205, an incoming RF signal transmitted by an eNB or another UE. The RF transceiver 210 down-converts the incoming RF signal to generate an intermediate frequency (IF) or baseband signal. The IF or baseband signal is sent to the RX processing circuitry 225, which generates a processed baseband signal by filtering, decoding, and/or digitizing the baseband or IF signal. The RX processing circuitry 225 transmits the processed baseband signal to the speaker 230 (such as for voice data) or to the processor 240 for further processing (such as for web browsing data).

The TX processing circuitry 215 receives analog or digital voice data from the microphone 220 or other outgoing baseband data (such as web data, e-mail, or interactive video game data) from the processor 240. The TX processing circuitry 215 encodes, multiplexes, and/or digitizes the outgoing baseband data to generate a processed baseband or IF signal. The RF transceiver 210 receives the outgoing processed baseband or IF signal from the TX processing circuitry 215 and up-converts the baseband or IF signal to an RF signal that is transmitted via the antenna 205.

The processor 240 can include one or more processors or other processing devices and can execute the OS program 261 stored in the memory 260 in order to control the overall operation of the UE 114. For example, the processor 240 could control the reception of forward channel signals and the transmission of reverse channel signals by the RF transceiver 210, the RX processing circuitry 225, and the TX processing circuitry 215 in accordance with well-known principles. In some embodiments, the processor 240 includes at least one microprocessor or microcontroller.

The processor 240 is also capable of executing other processes and programs resident in the memory 260. The processor 240 can move data into or out of the memory 260 as required by an executing process. In some embodiments, the processor 240 is configured to execute the applications 262 based on the OS program 261 or in response to signals received from eNBs, other UEs, or an operator. The processor 240 is also coupled to the I/O interface 245, which provides the UE 114 with the ability to connect to other devices such as laptop computers and handheld computers. The I/O interface 245 is the communication path between these accessories and the processor 240.

The processor 240 is also coupled to the input 250 (e.g., touchscreen, keypad, etc.) and the display 255. The operator of the UE 114 can use the input 250 to enter data into the UE 114. The display 255 can be a liquid crystal display or other display capable of rendering text and/or at least limited graphics, such as from web sites. The display 255 could also represent a touch-screen.

The memory 260 is coupled to the main 240. Part of the memory 260 could include a broadcast signaling memory (RAM), and another part of the memory 260 could include a Flash memory or other read-only memory (ROM).

As described in more detail below, the transmit and receive paths of the UE 114 support determining resources for repetitions, including no repetitions, and transmitting and receiving repetitions for transmissions of channels in a normal coverage mode (no repetitions) or in an enhanced coverage mode. In certain embodiments, the TX processing circuitry 215 and RX processing circuitry 225 include processing circuitry configured to determine resources for repetitions of channels transmissions in a normal coverage mode (no repetitions) or in an enhanced coverage mode. In certain embodiments, the processor 240 is configured to control the RF transceivers 210, the TX processing circuitry 215, or the RX processing circuitry 225, or a combination thereof, to determine resources for repetitions, including no repetitions, of transmissions in a normal mode or in an enhanced coverage mode.

Although FIG. 2 illustrates one example of UE 114, various changes can be made to FIG. 2. For example, various components in FIG. 2 could be combined, further subdivided, or omitted and additional components could be added according to particular needs. As a particular example, the processor 240 could be divided into multiple processors, such as one or more central processing units (CPUs) and one or more graphics processing units (GPUs). Also, while FIG. 2 illustrates the UE 114 configured as a mobile telephone or smart-phone, UEs could be configured to operate as other types of mobile or stationary devices. In addition, various components in FIG. 2 could be replicated, such as when different RF components are used to communicate with the eNBs 101-103 and with other UEs.

Figure 3:
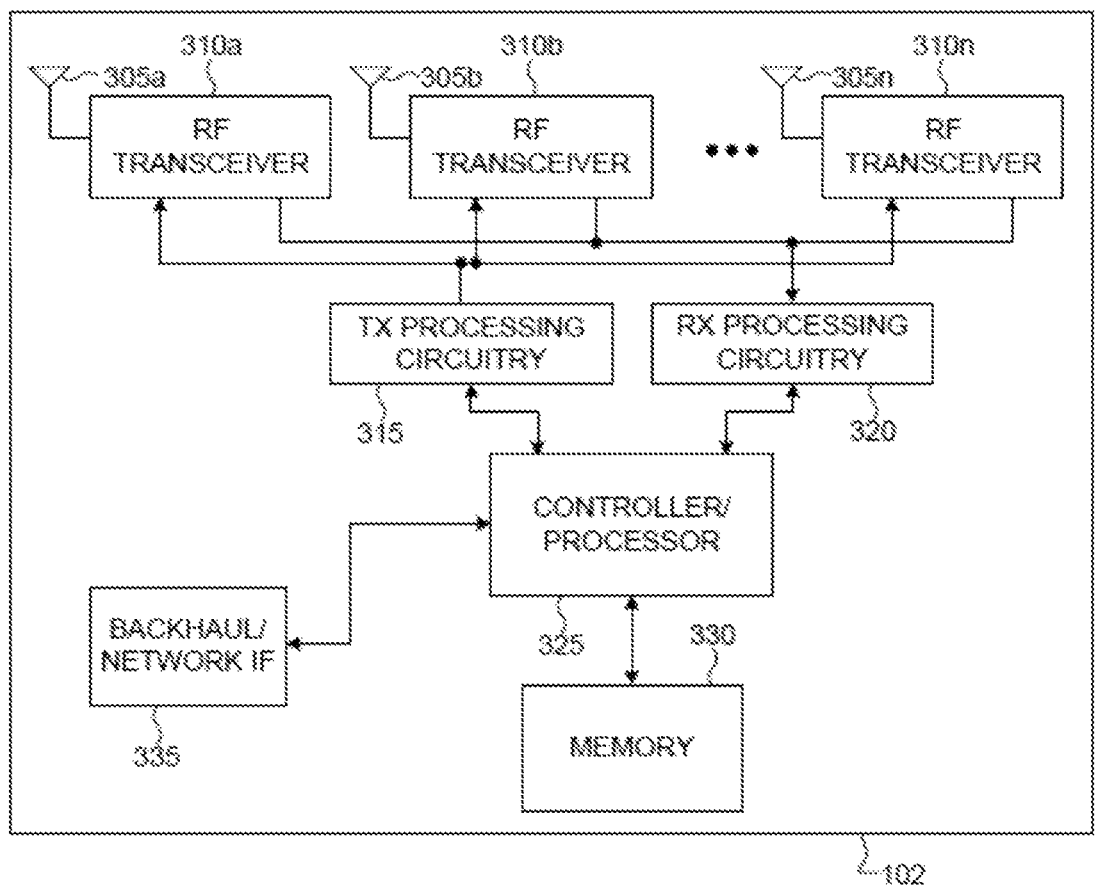
FIG. 3 illustrates an example enhanced NodeB (eNB) according to this disclosure.

FIG. 3 illustrates an example eNB 102 according to this disclosure. The embodiment of the eNB 102 shown in FIG. 3 is for illustration only, and other eNBs of FIG. 1 could have the same or similar configuration. However, eNBs come in a wide variety of configurations, and FIG. 3 does not limit the scope of this disclosure to any particular implementation of an eNB.

As shown in FIG. 3, the eNB 102 includes multiple antennas 305a-305n, multiple RF transceivers 310a-310n, transmit (TX) processing circuitry 315, and receive (RX) processing circuitry 320. The eNB 102 also includes a controller/processor 325, a memory 330, and a backhaul or network interface 335.

The RF transceivers 310a-310n receive, from the antennas 305a-305n, incoming RF signals, such as signals transmitted by UEs or other eNBs. The RF transceivers 310a-310n down-convert the incoming RF signals to generate IF or baseband signals. The IF or baseband signals are sent to the RX processing circuitry 320, which generates processed baseband signals by filtering, decoding, and/or digitizing the baseband or IF signals. The RX processing circuitry 320 transmits the processed baseband signals to the controller/processor 325 for further processing.

The TX processing circuitry 315 receives analog or digital data (such as voice data, web data, e-mail, or interactive video game data) from the controller/processor 325. The TX processing circuitry 315 encodes, multiplexes, and/or digitizes the outgoing baseband data to generate processed baseband or IF signals. The RF transceivers 310a-310n receive the outgoing processed baseband or IF signals from the TX processing circuitry 315 and up-converts the baseband or IF signals to RF signals that are transmitted via the antennas 305a-305n.

The controller/processor 325 can include one or more processors or other processing devices that control the overall operation of the eNB 102. For example, the controller/processor 325 could control the reception of forward channel signals and the transmission of reverse channel signals by the RF transceivers 310a-310n, the RX processing circuitry 320, and the TX processing circuitry 315 in accordance with well-known principles. The controller/processor 325 could support additional functions as well, such as more advanced wireless communication functions. For instance, the controller/processor 325 could support beam forming or directional routing operations in which outgoing signals from multiple antennas 305a-305n are weighted differently to effectively steer the outgoing signals in a desired direction. Any of a wide variety of other functions could be supported in the eNB 102 by the controller/processor 325. In some embodiments, the controller/processor 325 includes at least one microprocessor or microcontroller.

The controller/processor 325 is also capable of executing programs and other processes resident in the memory 330, such as a basic OS. The controller/processor 325 can move data into or out of the memory 330 as required by an executing process.

The controller/processor 325 is also coupled to the backhaul or network interface 335. The backhaul or network interface 335 allows the eNB 102 to communicate with other devices or systems over a backhaul connection or over a network. The interface 335 could support communications over any suitable wired or wireless connection(s). For example, when the eNB 102 is implemented as part of a cellular communication system (such as one supporting 5G, LTE, or LTE-A), the interface 335 could allow the eNB 102 to communicate with other eNBs over a wired or wireless backhaul connection. When the eNB 102 is implemented as an access point, the interface 335 could allow the eNB 102 to communicate over a wired or wireless local area network or over a wired or wireless connection to a larger network (such as the Internet). The interface 335 includes any suitable structure supporting communications over a wired or wireless connection, such as an Ethernet or RF transceiver.

The memory 330 is coupled to the controller/processor 325. Part of the memory 330 could include a RAM, and another part of the memory 330 could include a Flash memory or other ROM.

As described in more detail below, the transmit and receive paths of the eNB 102 support determination of resources for repetitions, including no repetitions, and transmission and reception of repetitions for channels transmissions to or from UEs in a normal mode or in an enhanced coverage mode. In certain embodiments, the TX processing circuitry 315 and RX processing circuitry 320 include processing circuitry configured to support determination of resources for repetitions of channels transmissions to low cost user equipments in a normal mode or in an enhanced coverage mode. In certain embodiments, the processor 240 is configured to control the RF transceivers 310a-310n, TX processing circuitry 315 or RX processing circuitry 320, or a combination thereof, to support determination of resources for repetitions of channels transmissions to low cost user equipments in a normal mode or in an enhanced coverage mode.

Although FIG. 3 illustrates one example of an eNB 102, various changes can be made to FIG. 3. For example, the eNB 102 could include any number of each component shown in FIG. 3. As a particular example, an access point could include a number of interfaces 335, and the controller/processor 325 could support routing functions to route data between different network addresses. As another particular example, while shown as including a single instance of TX processing circuitry 315 and a single instance of RX processing circuitry 320, the eNB 102 could include multiple instances of each (such as one per RF transceiver).

A transmission time interval (TTI) for DL signaling or UL signaling is referred to as a subframe (SF) and includes two slots. A unit of ten SFs is referred to as a frame. A bandwidth (BW) unit is referred to as a resource block (RB), one RB over one slot is referred to as a physical RB (PRB) and one RB over one SF is referred to as a PRB pair.

In some wireless networks, DL signals include data signals conveying information content, control signals conveying DL control information (DCI), and reference signals (RS) that are also known as pilot signals. The eNB 102 transmits data information through respective physical DL shared channels (PDSCHs). The eNB 102 also transmits DCI through respective physical DL control channels (PDCCHs) or enhanced PDCCH (EPDCCH). The eNB 102 can transmit one or more of multiple types of RS including a UE-common RS (CRS), a channel state information RS (CSI-RS), and a demodulation RS (DMRS) see also REF 1. The eNB 102 transmits a CRS over a DL system BW and the CRS can be used by UEs to demodulate data or control signals or to perform measurements. To reduce CRS overhead, the eNB 102 can transmit a CSI-RS with a smaller density in the time and/or frequency domain than a CRS. UE 114 can determine CSI-RS transmission parameters, when applicable, through higher layer signaling from eNB 102. DMRS is transmitted only in the BW of a respective PDSCH or PDCCH and UE 114 can use the DMRS to demodulate information in the PDSCH or the PDCCH. DL signals also include transmission of a logical channel that carries system control information is referred to as broadcast control channel (BCCH). A BCCH is mapped to either a transport channel referred to as a broadcast channel (BCH) or to a DL shared channel (DL-SCH). Most UE-common system information (SI) is included in different SI blocks (SIBs) that are transmitted using DL-SCH.

Figure 4:
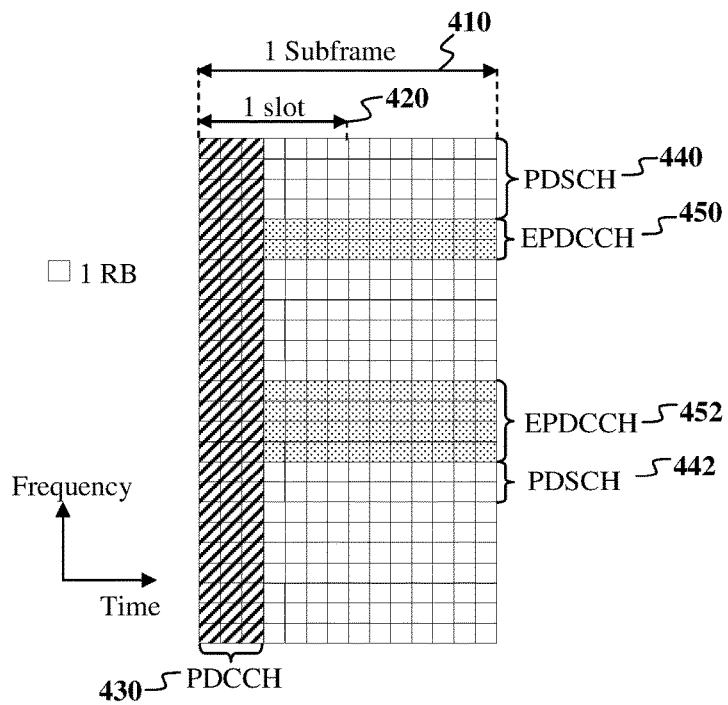
FIG. 4 illustrates an example DL SF structure for EPDCCH transmission or PDSCH transmission according to this disclosure.

FIG. 4 illustrates an example DL SF structure for EPDCCH transmission or PDSCH transmission according to this disclosure. The embodiment of the DL SF structure shown in FIG. 4 is for illustration only. Other embodiments could be used without departing from the scope of the present invention.

A DL SF 410 includes two slots 420 and a total of $N_{symb}^{DL}$ symbols for transmitting of data information and DCI. The first $M_{symb}^{DL}$ SF symbols are used to transmit PDCCHs and other control channels (not shown) 430. The remaining $N_{symb}^{DL} - M_{symb}^{DL}$ SF symbols are primarily used to transmit PDSCHs such as 440 and 442, or EPDCCHs such as 450 and 452. A transmission BW consists of frequency resource units referred to as resource blocks (RBs). Each RB consists of $N_{sc}^{RB}$ sub-carriers, or resource elements (REs), such as 12 REs. A unit of one RB over one SF is referred to as a physical RB (PRB). A UE can be allocated $M_{PDSCH}$ RBs for a total or $M_{sc}^{PDSCH} = M_{PDSCH} \cdot N_{sc}^{RB}$ REs for the PDSCH transmission BW. An EPDCCH transmission can be in one RB or in multiple of RBs.

In some wireless networks, UL signals include data signals conveying data information, control signals conveying UL control information (UCI), and UL RS. UE 114 transmits data information or UCI through a respective physical UL shared channel (PUSCH) or a physical UL control channel (PUCCH). When UE 114 needs to transmit data information and UCI in a same SF, UE 114 can multiplex both in a PUSCH. UCI includes HARQ acknowledgement (HARQ-ACK) information indicating correct (ACK) or incorrect (NACK) detection for data transport block (TB) in a PDSCH, or absence of a PDCCH detection (DTX), scheduling request (SR) indicating whether UE 114 has data in the UE's buffer, and channel state information (CSI) enabling eNB 102 to perform link adaptation for PDSCH transmissions to UE 114. The HARQ-ACK information is also transmitted by UE 114 in response to a detection of a PDCCH indicating a release of semi-persistently scheduled (SPS) PDSCH (see also REF 3). For brevity, this is not explicitly mentioned in the following descriptions.

UL RS includes DMRS and sounding RS (SRS). UE 114 transmits DMRS only in a BW of a respective PUSCH or PUCCH and eNB 102 can use a DMRS to demodulate data information or UCI. A DMRS is transmitted using a Zadoff-Chu (ZC) sequence having a cyclic shift (CS) and an orthogonal covering code (OCC) that eNB 102 can inform to UE 114 through a respective UL DCI format (see also REF 2) or configure by higher layer signaling such as radio resource control (RRC) signaling. UE 114 transmits SRS to provide eNB 102 with an UL CSI. The SRS transmission can be periodic (P-SRS), at predetermined SFs with parameters configured to UE 114 from eNB 102 by higher layer signaling, or aperiodic (A-SRS) as triggered by a DCI format scheduling PUSCH or PDSCH (DL DCI format) (see also REF 2 and REF 3).

Figure 5:
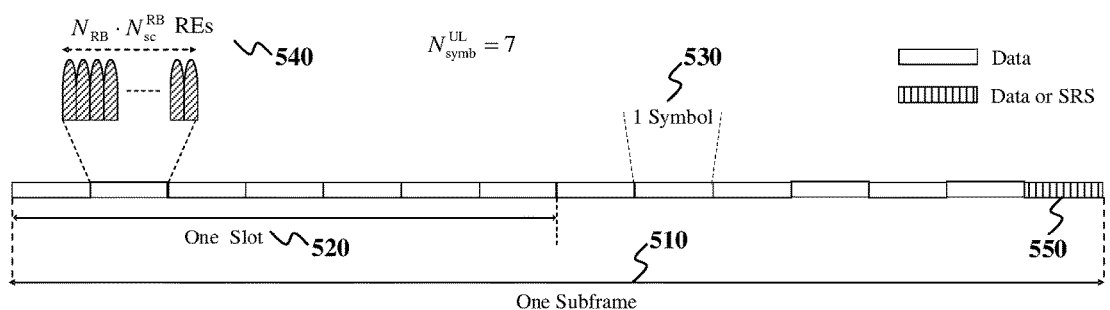
FIG. 5 illustrates an example UL SF structure for PUSCH transmission or PUCCH transmission according to this disclosure.

FIG. 5 illustrates an example UL SF structure for PUSCH transmission or PUCCH transmission according to this disclosure. The embodiment of the UL SF structure shown in FIG. 5 is for illustration only. Other embodiments could be used without departing from the scope of the present disclosure.

In the example shown in FIG. 5, an UL SF 510 includes two slots 520. Each slot 520 includes $N_{symb}^{UL}$ symbols 530 for transmitting data information, UCI, DMRS, or SRS. Each RB includes $N_{sc}^{RB}$ REs. UE 114 is allocated $N_{RB}$ RBs 540 for a total of $N_{RB} \cdot N_{sc}^{RB}$ REs for a transmission BW. For a PUCCH, $N_{RB}=1$. A last SF symbol can be used to multiplex SRS transmissions 550 from one or more UEs. A number of SF symbols that are available for data/UCI/DMRS transmission is $N_{symb} = 2 \cdot (N_{symb}^{UL} - 1) - N_{SRS}$, where $N_{SRS}=1$ when a last SF symbol is used to transmit SRS and $N_{SRS}=0$ otherwise.

Figure 6:
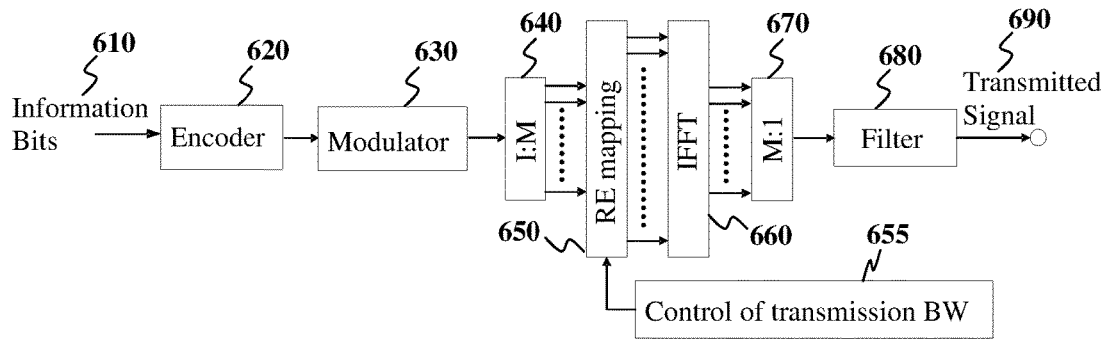
FIG. 6 illustrates a transmitter block diagram for a PDSCH in a SF according to this disclosure.

FIG. 6 illustrates a transmitter block diagram for a PDSCH in a SF according to this disclosure. The embodiment of the PDSCH transmitter block diagram shown in FIG. 6 is for illustration only. Other embodiments could be used without departing from the scope of the present invention.

Information bits 610 are encoded by encoder 620, such as a turbo encoder, and modulated by modulator 630, for example using quadrature phase shift keying (QPSK) modulation. A serial-to-parallel (S/P) converter 640 generates M modulation symbols that are subsequently provided to a mapper 650 to be mapped to REs selected by a transmission BW selection unit 655 for an assigned PDSCH transmission BW, unit 660 applies an inverse fast Fourier transform (IFFT), the output is then serialized by a parallel-to-serial (P/S) converter 670 to create a time domain signal, filtering is applied by filter 680, and a signal transmitted 690. Additional functionalities, such as data scrambling, cyclic prefix insertion, time windowing, interleaving, and others are well known in the art and are not shown for brevity.

Figure 7:
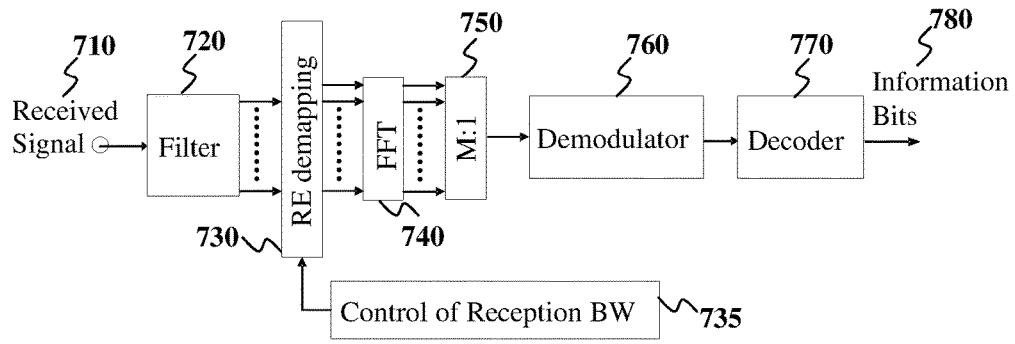
FIG. 7 illustrates a receiver block diagram for a PDSCH in a SF according to this disclosure.

FIG. 7 illustrates a receiver block diagram for a PDSCH in a SF according to this disclosure. The embodiment of the PDSCH receiver block diagram shown in FIG. 7 is for illustration only. Other embodiments could be used without departing from the scope of the present invention.

A received signal 710 is filtered by filter 720, REs 730 for an assigned reception BW are selected by BW selector 735, unit 740 applies a fast Fourier transform (FFT), and an output is serialized by a parallel-to-serial converter 750. Subsequently, a demodulator 760 coherently demodulates data symbols by applying a channel estimate obtained from a DMRS or a CRS (not shown), and a decoder 770, such as a turbo decoder, decodes the demodulated data to provide an estimate of the information data bits 780. Additional functionalities such as time-windowing, cyclic prefix removal, de-scrambling, channel estimation, and de-interleaving are not shown for brevity.

Figure 8:
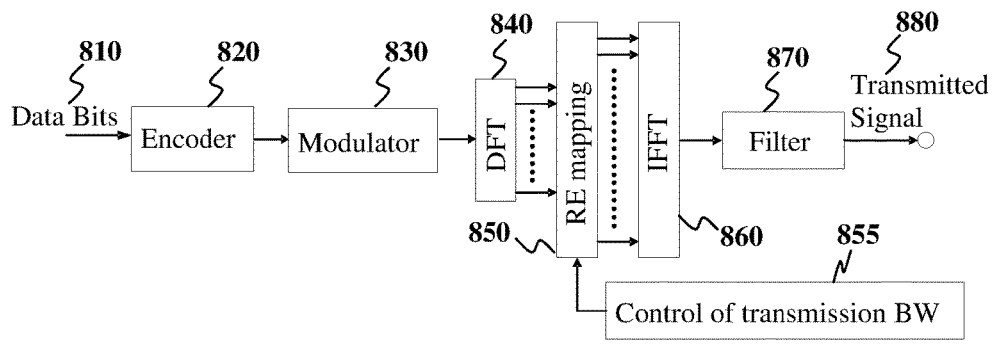
FIG. 8 illustrates a transmitter block diagram for a PUSCH in a SF according to this disclosure.

FIG. 8 illustrates a transmitter block diagram for a PUSCH in a SF according to this disclosure. The embodiment of the transmitter block diagram shown in FIG. 8 is for illustration only. Other embodiments could be used without departing from the scope of the present disclosure.

Information data bits 810 are encoded by encoder 820, such as a turbo encoder, and modulated by modulator 830. A discrete Fourier transform (DFT) filter 840 applies a DFT on the modulated data bits, REs 850 corresponding to an assigned PUSCH transmission BW are selected by transmission BW selection unit 855, filter 860 applies an IFFT and, after a cyclic prefix insertion (not shown), filtering is applied by filter 870 and a signal transmitted 880.

Figure 9:
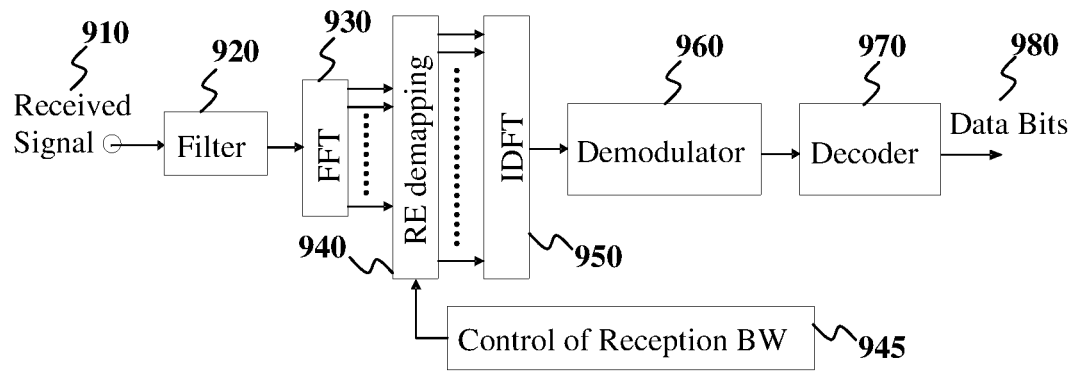
FIG. 9 illustrates a receiver block diagram for a PUSCH in a SF according to this disclosure.

FIG. 9 illustrates a receiver block diagram for a PUSCH in a SF according to this disclosure. The embodiment of the receiver block diagram shown in FIG. 6 is for illustration only. Other embodiments could be used without departing from the scope of the present disclosure.

A received signal 910 is filtered by filter 920. Subsequently, after a cyclic prefix is removed (not shown), filter 930 applies a FFT, REs 940 corresponding to an assigned PUSCH reception BW are selected by a reception BW selector 945, filter 950 applies an inverse DFT (IDFT), a demodulator 960 coherently demodulates data symbols by applying a channel estimate obtained from a DMRS (not shown), a decoder 970, such as a turbo decoder, decodes the demodulated data to provide an estimate of the information data bits 980.

Machine type communications (MTC) or internet of things (IoT) refers to communications of automated devices in a network. MTC through cellular networks is emerging as a significant opportunity for new applications in a networked world where devices communicate with humans and with each other. Compared to typical human communication, MTC typically has relaxed latency and quality of service (QoS) requirements and often does not require mobility support. MTC can be used for a wide variety of applications in different sectors including healthcare such as monitors, industrial, such as safety and security, energy, such as meters and turbines, transport, such as fleet management and tolls, and consumer and home, such as appliances and power systems.

An important requirement for commercial success of MTC is for respective UEs to have low power consumption and significantly lower cost than for UEs serving human communications. Cost reduction for low cost UEs (LC UEs), relative to UEs serving human communication, can be achieved, among other simplifications, by constraining a transmission BW and a reception BW to a small value, such as 6 RBs, of an UL system BW or a DL system BW, respectively, by reducing maximum size of a data TB a UE transmit or receive, or by implementing one receiver antenna instead of two receiver antennas.

LC UEs can be installed in basements of residential buildings or, generally, in locations where a LC UE experiences a large path-loss loss and poor coverage due to a low signal to noise and interference ratio (SINR). LC UE design selections of one receiver antenna and reduced maximum power amplifier gain can also result to coverage. loss even when a LC UE does not experience a large path-loss. Due to such reasons, a LC UE can require operation with enhanced coverage (EC). In extreme poor coverage scenarios, LC UEs can have characteristics such as very low data rate, greater delay tolerance, and limited mobility. Not all LC UEs require coverage enhancement (CE) (LC/CE UEs) or a same amount of CE. In addition, in different deployment scenarios, a required CE level can be different for different eNBs, for example depending on a eNB transmission power or on an associated cell size or on a number of eNB receiver antennas, as well as for different LC/CE UEs, for example depending on a location of a LC/CE UE.

LC/CE UE 114 or eNB 102 can support CE by repeating transmissions of channels either in a time domain or in a frequency domain. LC/CE UE 114 operating with CE can be configured by eNB 102 with a CE level corresponding to a number of SFs for a transmission or reception of a respective channel (number of repetitions for a transmission of a channel). For example, LC/CE UE 114 can be configured by eNB 102 a first number of repetitions for reception of a PDSCH transmission, a second number of repetitions for a PUSCH transmission, and so on.

A DL control channel for LC/CE UE 114 is assumed to be based on the EPDCCH structure and will be referred to as MPDCCH. In order to minimize a number of repetitions that LC/CE UE 114 needs to receive a PDSCH or an MPDCCH, respective transmissions can be over all RBs where LC/CE UE 114 can receive in a SF, such as in a sub-band of 6 contiguous RBs, as eNB 102 is assumed to not be power limited. Conversely, as LC/CE UE 114 uses a maximum transmission power when configured to transmit an UL channel with repetitions, in order to maximize a power spectral density, the UL channel transmission from LC/CE UE 114 can be limited to 1 RB or less than 1 RB per SF.

Transmissions of physical channels with repetitions consume additional resources and result to lower spectral efficiency and larger LC/CE UE power consumption. It is therefore beneficial to enable mechanisms that provide improved reception reliability. Such mechanisms include improved reliability of a channel estimate used for coherent demodulation of data or control symbols, frequency diversity through frequency hopping when sub-band CSI is either not available or not reliable, and coding diversity through a use of incremental redundancy (IR) with different redundancy versions (RVs) among repetitions of a data channel transmission (see also REF 2 and REF 3).

Certain embodiments of this disclosure provide a determination of sub-bands in a DL system BW or of sub-bands in an UL system BW for communication between eNB 102 and LC/CE UE 114. Certain embodiments of this disclosure also provide mechanisms to signal sub-bands or RBs for MPDCCH or PDSCH transmissions from eNB 102 to LC/CE UE 114 and for PUSCH or PUCCH transmissions from LC/CE UE 114 to eNB 102. Additionally, certain embodiments of this disclosure provide mechanisms to enable coding diversity for transmissions with repetitions from eNB 102 to LC/CE UE 114 or from LC/CE UE 114 to eNB 102 while improving an accuracy of a channel estimate and simplifying a receiver implementation. Further, certain embodiments of this disclosure provide randomization of PDSCH transmissions that are not scheduled by an MPDCCH in order to mitigate interference among such PDSCH transmissions from neighboring eNBs.

The following embodiments are not limited to LC/CE UEs and can be applicable to any type of UEs requiring coverage enhancements. This includes UEs that can receive over the entire DL system BW or transmit over the entire UL system BW at a given time instance (referred to as conventional UEs). In the following, for brevity, FDD is considered as the duplex method for both DL and UL signaling but the embodiments of the disclosure are also directly applicable to TDD. MPDCCH or PDSCH transmission to a LC/CE UE and PUCCH or PUSCH transmissions from a LC/CE UE are assumed to be with repetitions, including no repetitions, in a number of SFs.

Various embodiments of the disclosure provide for determination and allocation of sub-bands in a DL system BW or in an UL system BW.

A first step in determining a frequency hopping pattern for repetitions of an MPDCCH or a PDSCH transmission from eNB 102 to LC/CE UE 114, or for repetitions of a PUCCH or a PUSCH transmission from LC/CE UE 114 to eNB 102, is a determination of respective sub-bands in a DL system BW or a determination of respective sub-bands or RBs in an UL system BW. As this determination can be same in the DL and the UL, only the DL is subsequently referenced for brevity.

A number of available sub-bands in a DL system BW of $M_{RB}^{DL}$ RBs is equal to $\lfloor M_{RB}^{DL}/6 \rfloor$ where a sub-band is assumed to include 6 consecutive RBs and $\lfloor\ \rfloor$ is the 'floor' function that rounds a number to its immediately smaller integer.

In a first approach, RBs allocated to sub-bands are counted either from the lowest indexed RB or from the highest indexed RB. A number of $M_{RB}^{DL} - \lfloor M_{RB}^{DL}/6 \rfloor \cdot 6$ highest indexed or lowest indexed RBs, respectively, are not included in any sub-band.

As eNB 102 can boost, when possible, a transmission power to LC/CE UE 114 that is configured to receive repetitions of an MPDCCH or a PDSCH transmission, in order to reduce a number of repetitions required for LC/CE UE 114 to detect a respective MPDCCH or PDSCH with a target block error rate (BLER), it can be beneficial to place the sub-bands in the interior of the DL system BW in order to reduce the effect of out-of-band emissions. Then, in a second approach, the sub-bands exclude $M_{RB}^{DL} - \lfloor M_{RB}^{DL}/6 \rfloor \cdot 6$ RBs where the indexing of excluded RBs alternates between the lowest indexed ones and the highest indexed ones. For example, for $M_{RB}^{DL}=50$ RBs, there can be 8 non-overlapping sub-bands, each of 6 RBs, over 48 RBs and the 2 excluded RBs are the lowest indexed one and the highest indexed one; that is, $(M_{RB}^{DL} - \lfloor M_{RB}^{DL}/6 \rfloor \cdot 6)/2$ RBs with the lowest indexes and $(M_{RB}^{DL} - \lfloor M_{RB}^{DL}/6 \rfloor \cdot 6)/2$ RBs with the highest indexes are excluded.

Figure 10:
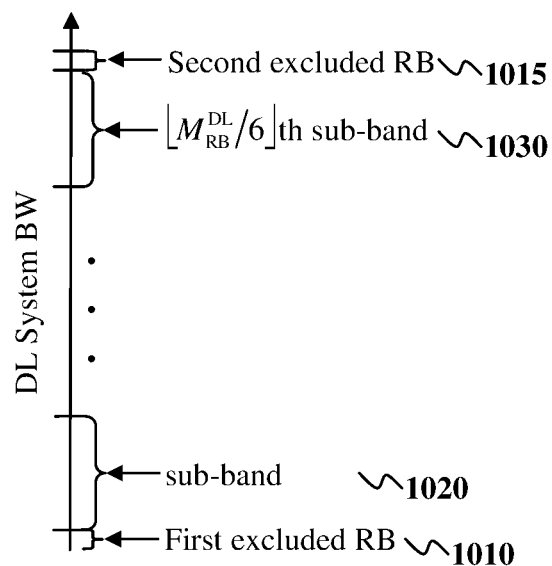
FIG. 10 illustrates an allocation of sub-bands in a DL system BW according to this disclosure.

FIG. 10 illustrates an allocation of sub-bands in a DL system BW according to this disclosure.

A DL system BW includes $M_{RB}^{DL}$ RBs. A number of sub bands equal to $\lfloor M_{RB}^{DL}/6 \rfloor$ is defined where each sub-band includes 6 consecutive RBs and different sub-bands do not include any overlapping RBs. There are $M_{RB}^{DL} - \lfloor M_{RB}^{DL}/6 \rfloor \cdot 6 = 2$ RBs that are not allocated to any sub-band. The 2 RBs are the RB with the lowest index 1010 and the RB with the highest index 1015 in the DL system BW. The RBs of the DL system BW that exclude the first RB and the last RB are allocated to the $\lfloor M_{RB}^{DL}/6 \rfloor$ sub-bands where all sub-bands include mutually different RBs and where the first sub-band 1020 includes the 6 lower indexed RBs (other than the first RB of the DL system BW) and the last sub-band 1030 includes the 6 highest indexed RB (other than the last RB of the DL system BW). Therefore, there is a total of $N_{SB}^{DL} = \lfloor M_{RB}^{DL}/6 \rfloor$ sub-bands in a DL system BW, numbered as $n_{SB}^{DL}=0, \ldots, N_{SB}^{DL}-1$ in order of increasing RB number, and sub-band $n_{SB}^{DL}$ includes the 6 RBs $6 \cdot n_{SB}^{DL} + n_0 + n$ where $n=0, 1, \ldots, 5$ and, for even values of $M_{RB}^{DL}$ and $N_{SB}^{DL}$, $n_0=(M_{RB}^{DL} - 6 \cdot N_{SB}^{DL})/2$.

Configuration of Sub-Bands for MPDCCH Transmission

In a first approach, a configuration of sub-bands for $R^{M-PDCCH}$ repetitions of an MPDCCH transmission to LC/CE UE 114 can be part of a RRC connection setup between LC/CE UE 114 and eNB 102 after LC/CE UE 114 has established initial access with eNB 102 using a random access process. The RRC connection setup can be provided by "message 4" of the random access process or by a subsequent PDSCH transmission. In addition to the configuration of sub-bands for repetitions of an MPDCCH transmission, a first sub-band for a first number of repetitions in respective SFs, $R_{SB}^{M-PDCCH}$, assuming frequency hopping of an MPDCCH transmission across the configured sub-bands, needs to be indicated by eNB 102 to LC/CE UE 114 in order to allow MPDCCH transmissions to different LC/CE UEs in different sub-bands during same SFs. Therefore, eNB 102 indicates to LC/CE UE 114 the sub-bands for repetitions of an MPDCCH transmission from a total of $\lfloor M_{RB}^{DL}/6 \rfloor$ sub-bands and a sub-band for a first number of repetitions, from the $R^{M-PDCCH}$ repetitions, of an MPDCCH transmission.

In another example, eNB 102 configures to LC/CE UE 114 the sub-bands for MPDCCH repetitions using a bit-map having a size equal to a number of sub-bands in the DL system BW wherein a binary '1', for example, can indicate that a sub-band is used for a repetition of an MPDCCH transmission. For example, for a DL system BW of $M_{RB}^{DL}=50$ RBs, there can be $N_{SB}^{DL}=\lfloor M_{RB}^{DL}/6 \rfloor=8$ sub-bands and the bit-map size is 8 bits while for a DL system BW of $M_{RB}^{DL}=100$ RBs, there can be $N_{SB}^{DL}=\lfloor M_{RB}^{DL}/6 \rfloor=16$ sub-bands and the bit-map size when 16 bits.

In yet another example, when a number of sub-bands $N_{SB}^{M-PDCCH}$ used for repetitions of an MPDCCH transmission is predetermined, either in the system operation or by configuration, such as for example $N_{SB}^{M-PDCCH}=2$ or $N_{SB}^{M-PDCCH}=4$ sub-bands, it is possible to reduce a number of bits required for indicating the sub-bands used for repetitions of an MPDCCH transmission by using a combinatorial index r (see also REF 3).

The combinatorial index r corresponds to the sub-band index $$\{k_i\}_{i=0}^{N_{SB}^{M-PDCCH}-1}, (1 \le k_i \le N_{SB}^{DL}, k_i < k_{i+1})$$

and is given by equation $$r = \sum_{i=0}^{N_{SB}^{M-PDCCH}-1} \binom{N_{SB}^{DL} - k_i}{N_{SB}^{M-PDCCH} - i}$$

where $$\binom{x}{y} = \begin{cases} \binom{x}{y} & x \ge y \\ 0 & x < y \end{cases}$$

is the extended binomial coefficient, resulting in unique label $$r \in \left\{0, \ldots, \binom{N_{SB}^{DL}}{N_{SB}^{M-PDCCH}} - 1\right\}.$$

The number of bits needed to indicate the index r is $$\left\lceil \log_2 \binom{N_{SB}^{DL}}{N_{SB}^{M-PDCCH}} \right\rceil$$

where ⌈ ⌉ is the 'ceiling' function that rounds a number to its immediately larger integer. For example, for $N_{SB}^{DL}=8$ and $N_{SB}^{M-PDCCH}=2$ the number of bits is 5, while for $N_{SB}^{DL}=16$ and $N_{SB}^{M-PDCCH}=2$ the number of bits is 7. When $N_{SB}^{M-PDCCH}$ is not predetermined in the system operation but also needs to be indicated among $S_{M-PDCCH}$ possible values, $\lceil \log_2 S_{M-PDCCH} \rceil$ additional bits are needed. For example, when possible values for $S_{SB}^{M-PDCCH}$ are 2 and 4, one additional bit is needed.

A number of bits required to indicate $N_{SB}^{M-PDCCH}$ sub-bands for repetitions of an MPDCCH transmission, using either the bit-map or the combinatorial index, can be reduced when the $N_{SB}^{M-PDCCH}$ sub-bands are restricted to have a predefined symmetry that is determined by an offset relative to a first sub-band that eNB 102 configures to UE 114. The offset can be predefined or configured by eNB 102 to LC/CE UE 114 and is common for all LC/CE UEs. For example, for $N_{SB}^{M-PDCCH}=2$ and a predetermined offset, when a sub-band with index $k_1$, $0 \leq k_1 < \lfloor N_{SB}^{DL}/2 \rfloor$, is configured to UE 114 by eNB 102, the sub-band with index $k_1 + \lfloor N_{SB}^{DL}/2 \rfloor$ (offset of $\lfloor N_{SB}^{DL}/2 \rfloor$ sub-bands) or the sub-band with index $N_{SB}^{DL} - k_1 - 1$ (mirrored sub-band from the other side of the DL BW) is also configured as a result of the predefined symmetry. For example, for $N_{SB}^{M-PDCCH}=2$ and an offset $O_{SB}^{DL}$ configured by eNB 102 to LC/CE UE 114 through a SIB, the sub-band with index $k_2 = k_1 + O_{SB}^{DL}$ (modulo $N_{SB}^{DL}$) is also configured by eNB 102 to UE 114 as a result of the configuration of the first sub-band with index $k_1$ and the offset $O_{SB}^{DL}$.

Figure 11:
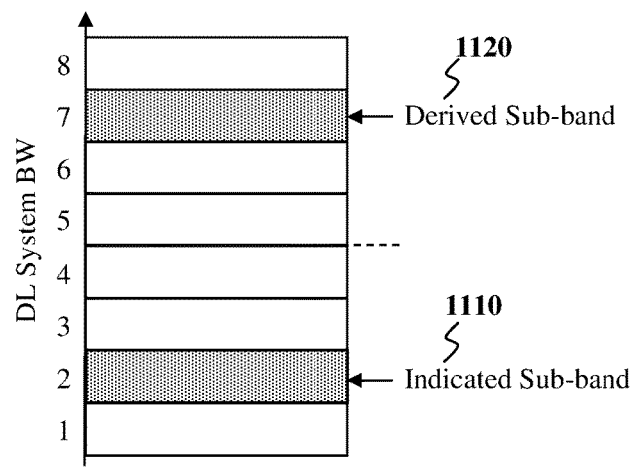
FIG. 11 illustrates an indication of sub-bands for an MPDCCH transmission according to this disclosure.

FIG. 11 illustrates an indication of sub-bands for an MPDCCH transmission according to this disclosure.

A DL system BW includes $N_{SB}^{DL}=8$ sub-bands and eNB 102 configures LC/CE UE 114 with $N_{SB}^{M-PDCCH}=2$ sub-bands for repetitions of an MPDCCH transmission. LC/CE UE 114 is also configured by eNB 102 a first sub-band with index $k_1=1$ 1110 among the first $\lfloor N_{SB}^{DL}/2 \rfloor = 4$ sub-bands. LC/CE UE 114 derives a second sub-band 1120 with index $k_2=6$ either based on a predefined symmetry for the second sub-band index of $N_{SB}^{DL} - k_1 - 1 = 6$ or based on a configured offset with value $O_{SB}^{DL}=5$ ($k_2=k_1+O_{SB}^{DL}$).

After eNB 102 configures to LC/CE UE 114 the $N_{SB}^{M-PDCCH}$ sub-bands for repetitions of an MPDCCH transmission, eNB 102 transmits and LC/CE UE 114 receives first $R_{SB}^{M-PDCCH}$ repetitions of an MPDCCH transmission in the first sub-band. The next $R_{SB}^{M-PDCCH}$ repetitions are in the sub-band with the next higher index, among the configured sub-bands for repetitions of an MPDCCH transmission, with a wrap-around to the lowest index when the highest index is reached. Equivalently, an index for a next sub-band for $R_{SB}^{M-PDCCH}$ repetitions of an MPDCCH transmission can be determined as $(i+1) \mod N_{SB}^{M-PDCCH}$ where i is the sub-band index for current $R_{SB}^{M-PDCCH}$ repetitions of the MPDCCH transmission.

When eNB 102 does not configure to LC/CE UE 114 a first sub-band for first repetitions of an MPDCCH transmission, LC/CE UE 114 can implicitly determine a first sub-band for first $R_{SB}^{M-PDCCH}$ repetitions of an MPDCCH transmission based on a cell radio network temporary identifier (C-RNTI), or identity (ID), that eNB 102 configures to LC/CE UE 114. For example, as an index of a first sub-band can be equal to C-RNTI mod($N_{SB}^{DL}$).

In another example, a set of sub-bands can be predetermined for a given DL system BW and an index can indicate sub-bands from the set of sub-bands. For example, a set of sub-bands can include 4 sub-band pairs and a 2-bit index can indicate one of the 4 sub-band pairs.

In a second approach, a configuration of a number of sub-bands for repetitions of an MPDCCH transmission to LC/CE UE 114 can be in a system information block (SIB) transmitted from eNB 102 using a same signaling method as described for the first approach. A determination by LC/CE UE 114 of a first sub band for first $R_{SB}^{M-PDCCH}$ repetitions of an MPDCCH transmission can be as described for the first approach, either explicitly by RRC signaling from eNB 102 to LC/CE UE 114 or implicitly based on another configuration to LC/CE UE 114 such as a C-RNTI or a global ID for LC/CE UE 114.

In case a CSS is supported for MPDCCH transmissions then, when SIBs are scheduled by MPDCCH transmitted in the CSS, respective sub-bands can be indicated in a master information block (MIB) and a first sub-band for first repetitions of an MPDCCH transmission can always be the lower indexed sub-band with a next number of repetitions being in the sub-band with the next higher index; otherwise, the CSS sub-bands can be indicated in a SIB. The previously described approaches for signaling sub-bands for repetitions of an MPDCCH transmission can apply. To reduce a number of bits required to indicate the sub-bands for CSS, predetermined sub-sets of the $N_{SB}^{DL}$ sub-bands can be considered. For example, one from four predetermined sub-sets of sub-bands can be indicated using 2 bits. When a single subset of sub-bands can exist and can be determined by other means, such as Physical Cell ID (PCID) for an eNB, and no explicit signaling is needed. Further, the number of CSS sub-bands, $N_{SB}^{CSS}$, can be predetermined in the system operation, such as $N_{SB}^{CSS}=2$ sub bands or $N_{SB}^{CSS}=4$ sub-bands.

In order to enable repetitions of different MPDCCH transmissions in a same set of sub-bands, eNB 102 can configure to LC/CE UE 114 an index of a first sub-band for a first number of repetitions of an MPDCCH transmission. For a total $N_{SB}^{DL}$ DL sub-bands, eNB 102 can configure LC/CE UE 114 a first sub-band index using $\lceil \log_2(N_{SB}^{DL}) \rceil$ bits. The remaining of $N_{SB}^{M-PDCCH}$ sub-band indexes can be determined by adding (modulo $N_{SB}^{DL}$) a, predefined or configured by $\lceil \log_2(N_{SB}^{DL}) \rceil$ bits in a SIB, offset $O_{SB}^{DL}$ to the first sub-band index as previously described, for example in FIG. 11. Therefore, denoting by $k_1$, $0 \leq k_1 < N_{SB}^{DL}$, the index of the first sub-band, the index of a second sub-band is $k_2 = (k_1 + O_{SB}^{DL}) \mod N_{SB}^{DL}$. For example, for a set that includes two sub-bands for an MPDCCH transmission, eNB 102 can configure LC/CE UE 114 to transmit a first repetition in the first of the two sub-bands and eNB 102 can configure a second LC/CE UE to transmit a first repetition in the second of the two sub-bands. Further, an explicit configuration can instead be avoided and LC/CE UE 114 can implicitly determine an index of a sub-band to transmit first repetitions of an MPDCCH transmission as (C-RNTI) mod $N_{SB}^{DL}$.

Repetitions for an MPDCCH transmission can also be in a subset of configured sub-bands in order to maximize a number of repetitions in a same sub-band and apply DMRS filtering to improve channel estimation. In such case, repetitions for a first MPDCCH transmission to LC/CE UE 114 can be in a first subset of configured sub-bands while repetitions for a second MPDCCH transmission to LC/CE UE 114 can be in a second subset of configured sub-bands, different than the first subset of configured sub-bands, in order to enable LC/CE UE 114 to obtain CSI for every sub-band in the configured set of sub-bands. For example, when LC/CE UE 114 is configured with $N_{SB}^{M\text{-}PDCCH}$ sub-bands for repetitions of an MPDCCH transmission, LC/CE UE 114 can monitor (presumed) repetitions for a first MPDCCH transmission in the first and third sub-bands and monitor (presumed) repetitions for a second MPDCCH transmission in the second and fourth sub-bands. Equivalently, sub-bands for possible MPDCC a can alternate within a configured set of sub-hands. The eNB 102 may or may not actually transmit the first MPDCCH or the second MPDCCH.

Configuration of Sub-Bands for PDSCH Transmission

In a first approach, eNB 102 configures LC/CE UE 114 same sub-bands for repetitions of a PDSCH transmission and for repetitions of an MPDCCH transmission. There is no separate (additional) configuration of sub-bands for repetitions of a PDSCH transmission. For a determination of a first sub-band for first $R_{SB}^{PDSCH}$ consecutive repetitions per sub-band of a PDSCH transmission, two example implementations are provided.

In a first example implementation, a first sub-band for first $R_{SB}^{PDSCH}$ of a PDSCH transmission is same as a last sub-band for $R_{SB}^{M\text{-}PDCCH}$ consecutive repetitions of an MPDCCH transmission. The first example implementation provides a benefit that LC/CE UE 114 is able to immediately receive PDSCH after detecting a respective DCI format conveyed by an MPDCCH without LC/CE UE 114 incurring re-tuning delay that is associated with receiving PDSCH in a first sub-band that is different than a last sub-band of an MPDCCH reception scheduling the PDSCH.

In a second example implementation, a first sub-band for first $R_{SB}^{PDSCH}$ repetitions of a PDSCH transmission is same as a next sub band for $R_{SB}^{M\text{-}PDCCH}$ repetitions of an MPDCCH transmission according to a frequency (sub-band) hopping pattern. The second example implementation provides a benefit of combining MPDCCH and PDSCH transmissions in a same frequency hopping pattern and simplifies a multiplexing of MPDCCH and PDSCH transmissions with same or different numbers of repetitions particularly when $R_{SB}^{PDSCH}=R_{SB}^{M\text{-}PDCCH}$. Moreover, when additional latency is provided to LC/CE UE 114 for decoding a DCI format conveyed by an MPDCCH, a re-tuning delay is not an issue due to the additional decoding latency.

Figure 12:
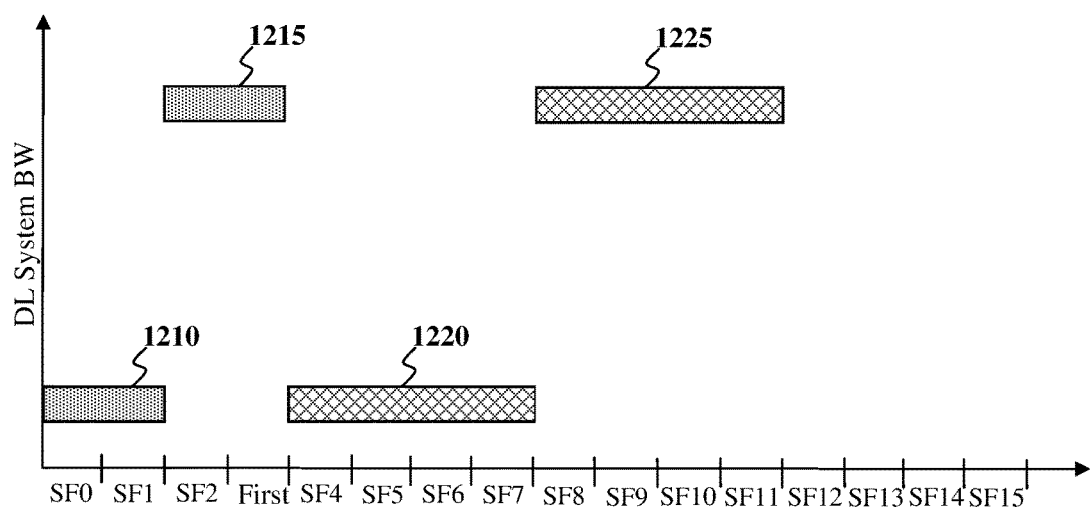
FIG. 12 illustrates a determination of sub-bands for repetitions of a PDSCH transmission based on sub-bands for repetitions of an MPDCCH transmission according to this disclosure.

FIG. 12 illustrates a determination of sub-bands for repetitions of a PDSCH transmission based on sub-bands for repetitions of an MPDCCH transmission according to this disclosure.

A same two sub-bands are used for repetitions of an MPDCCH transmission and for repetitions of a PDSCH transmission to LC/CE UE 114. LC/CE UE 114 first receives the MPDCCH over 2 SFs in the first sub-band 1210 and then over 2 SFs in the second sub-band 1215. LC/CE UE 114 first receives the PDSCH over 4 SFs in the first sub-band 1220 and then over 4 SFs in the second sub-band 1225. A switching period for re-tuning between RBs of different sub-bands is not shown for brevity.

In a second approach, eNB 102 independently configures LC/CE UE 114 sub-bands for repetitions of a PDSCH transmission and sub-bands for repetitions of an MPDCCH transmission. A first sub band for first $R_{SB}^{PDSCH}$ repetitions of a PDSCH transmission is configured using a respective field in a DCI format conveyed by an MPDCCH and scheduling the PDSCH transmission. For example, a 1-bit field in the DCI format can indicate whether a first sub-band for first $R_{SB}^{PDSCH}$ repetitions of a PDSCH transmission is one of two predetermined sub-bands. For example, a field of $\lceil \log_2(N_{SB}^{DL}) \rceil$ bits can indicate any sub-band in a DL system BW of $N_{SB}^{DL}$ sub-bands as a first sub-band for first $R_{SB}^{PDSCH}$ repetitions of a PDSCH transmission. The remaining sub-bands for respective remaining repetitions for the PDSCH transmission can be determined from, a predetermined or configured by $\lceil \log_2(N_{SB}^{DL}) \rceil$ bits, offset relative to the first sub-band in a same manner as for determining remaining sub-bands for an MPDCCH transmission based on a first respective sub-band.

A DCI format scheduling a PDSCH transmission can include an indication of RBs in addition to including an indication of a first sub-band for first number of $R_{SB}^{PDSCH}$ repetitions for the PDSCH transmission. For example, for a DL system BW of 100 RBs, there can be $N_{SB}^{DL}=16$ sub-bands of $N_{RB}^{SB}=6$ RBs and a sub-band can be indicated with $\lceil \log_2(N_{SB}^{DL}) \rceil = \lceil \log_2(16) \rceil = 4$ bits in the DCI format. Within an indicated sub-band, a number of consecutive RBs can be indicated using $\lceil \log_2(N_{RB}^{SB}(N_{RB}^{SB}+1)/2) \rceil = 5$ bits. When an allocation of RBs can be restricted to be in a multiple of RBs, such as 2 RBs, a bit-map of 3 bits suffices.

Configuration of Sub-Bands or RBs for PUSCH Transmission

Repetitions for a PUSCH transmission from LC/CE UE 114 to eNB 102 are considered to be in RBs or in fractions of RBs (unlike repetitions of an MPDCCH transmission or a PDSCH transmission that are considered to be within sub-bands of 6 RBs). The reason is that for a LC/CE UE that is coverage limited and configured to transmit a PUSCH with repetitions, it is preferable for a transmission power to be concentrated in a small transmission BW in order to maximize a respective power spectral density. Configuration of RBs is subsequently considered for brevity but same principles apply for configuration of sub-bands and of RBs within each sub-band, for example as described for a PDSCH transmission.

In a first approach, a configuration of RBs for repetitions of a PUSCH transmission from LC/CE UE 114 can be part of the configuration for RRC connection setup of LC/CE UE 114 with eNB 102. The RRC connection setup can be provided either by "message 4" of an initial random access process or by a subsequent PDSCH. In addition to a configuration of RBs for repetitions of a PUSCH transmission, eNB 102 configures to LC/CE UE 114 a first RB for a first number of $R_{RB}^{PUSCH}$ repetitions for a PUSCH transmission in order to allow multiplexing of PUSCH transmissions from different LC/CE UEs in different RBs during the same SFs. Therefore, eNB 102 indicates to LC/CE UE 114 a number of RBs $M_{RB}^{PUSCH}$ for repetitions of a PUSCH transmission and a first RB for a first number of repetitions of a PUSCH transmission.

In a first example, RBs for repetitions of a PUSCH transmission can be indicated using a bit-map having a size defined by the number of RBs in the UL system BW wherein a binary '1', for example, can indicate that a RB is used for a repetition of a PUSCH transmission. For example, for a UL system BW of 50 RBs, the bit-map size is 50 bits.

In a second example, when a number of $M_{RB}^{PUSCH}$ RBs used for repetitions of a PUSCH transmission is restricted to be one from a finite set of numbers of RBs, such as for example 2 RBs, it is possible to reduce a number of bits required for indicating the RBs used for repetitions of a PUSCH transmission by using a combinatorial index r as it was previously described for the case of an MPDCCH transmission. The combinatorial index r corresponds to the RB index $$\{k_i\}_{i=0}^{M_{RB}^{PUSCH}-1}, (0 \le k_i < M_{RB}^{UL}, k_i < k_{i+1})$$

and is given by equation $$r = \sum_{i=0}^{M_{RB}^{PUSCH}-1} \binom{M_{RB}^{UL}-k_i}{M_{RB}^{PUSCH}-i} \text{ where } \binom{x}{y} = \begin{cases} \binom{x}{y} & x \ge y \\ 0 & x < y \end{cases}$$

is the extended binomial coefficient, resulting in unique label $$r \in \left\{0, \ldots, \binom{U_{RB}^{UL}}{M_{RB}^{PUSCH}} - 1\right\}.$$

The number of bits needed to indicate the index r is $$\left\lceil \log_2 \binom{M_{RB}^{UL}}{M_{RB}^{PUSCH}} \right\rceil.$$

For example, for $M_{RB}^{UL}=50$ and $M_{RB}^{PUSCH}=2$, the number of bits is 11. When $M_{RB}^{PUSCH}$ is not predetermined in the system operation but also needed to be indicated among $S_{PUSCH}$ possible values, $\lceil \log_2 S_{PUSCH} \rceil$ additional bits are needed. For example, when possible values for $M_{RB}^{PUSCH}$ are 2 and 4, one additional bit is needed.

A number of bits required to indicate RBs for repetitions of a PUSCH transmission, using either the bit-map or the combinatorial index approach, can be reduced when the RBs are restricted to have a predefined symmetry that is determined by an offset relative to a first RB that eNB 102 configures to UE 114. For example, for $N_{RB}^{PUSCH}=2$, when RB with index i, $0 \le i < \lfloor M_{RB}^{UL}/2 \rfloor$, is configured for a PUSCH transmission, the RB with index $i+\lfloor M_{RB}^{UL}/2 \rfloor$ (offset of $\lfloor M_{RB}^{UL}/2 \rfloor$ RBs) is also configured or, in another example, the RB with index $M_{RB}^{UL}-i-1$ (mirrored RB from the other side of the UL BW) is also configured as a result of the predefined symmetry. Further, instead of the offset being predetermined relative to a configured first RB for a first number of repetitions of a PUSCH transmission, the offset $O_{RB}^{UL}$ can also be configured by eNB 102 to LC/CE UE 114 and consequently, for $M_{RB}^{PUSCH}=2$, the RB with index $i+O_{RB}^{UL}$ is also configured by eNB 102 to LC/CE UE 114 as a result of the first configured RB with index i and the configured offset $O_{RB}^{UL}$.

In a second approach, the configuration of RBs for repetitions of a PUSCH transmission to a LC/CE UE can be in a SIB transmitted from an eNB using a same signaling method as described for the first approach. A determination by LC/CE UE 114 of a first RB for first $R_{RB}^{PUSCH}$ repetitions of a PUSCH transmission can be as described for the first approach, that is either by RRC signaling specific to LC/CE UE 114 or implicit based on another configuration to LC/CE UE 114 such as a C-RNTI or a global ID for LC/CE UE 114.

Three implementations are disclosed for an indication of a first RB for first $N_{RB}^{PUSCH}$ repetitions of a PUSCH transmission. In a first implementation, a first RB for first $R_{RB}^{PUSCH}$ repetitions of a PUSCH transmission is indicated using a bit-map of size $M_{RB}^{PUSCH}$ bits.

In a second implementation, when a number of RBs $M_{RB}^{PUSCH}$ for repetitions of a PUSCH transmission is same as a number of sub-bands $N_{SB}^{M-PDCCH}$ for repetitions of an MPDCCH transmission, a RB for first $R_{RB}^{PUSCH}$ repetitions of a PUSCH transmission is the RB with a same index as a sub-band for first $R_{SB}^{M-PDCCH}$ repetitions of an MPDCCH transmission scheduling the PUSCH transmission. For example, for $M_{RB}^{PUSCH}=N_{SB}^{M-PDCCH}=2$, when first $R_{SB}^{M-PDCCH}$ repetitions for a MPDCCH scheduling a PUSCH transmission are in the first of the $N_{SB}^{M-PDCCH}=2$ sub-bands, the first $R_{RB}^{PUSCH}$ repetitions of the PUSCH transmission are also in the first of the $M_{RB}^{PUSCH}=2$ RBs. The second implementation provides the benefit of combining MPDCCH and PUSCH transmissions in a same frequency hopping pattern and simplifies the multiplexing of MPDCCH and PUSCH transmissions for different LC/CE UEs without requiring additional signaling to avoid PUSCH resource collisions.

In a third implementation, a first RB for first $R_{RB}^{PUSCH}$ repetitions of a PUSCH transmission is indicated using a respective field in a DCI format conveyed by an MPDCCH and scheduling the PUSCH and remaining RBs for repetitions of the PUSCH transmission are determined from a predetermined or configured offset $O_{RB}^{UL}$. For example, for an UL system BW of 100 RBs, there can be $N_{RB}^{UL}=16$ sub-bands, each including $N_{RB}^{SB}=6$ RBs, and a first sub-band can be indicated with $\lceil \log_2(N_{SB}^{UL}) \rceil = \lceil \log_2(16) \rceil = 4$ bits in the DCI format. Within an indicated sub-band, a number of consecutive RBs can be indicated using $\lceil \log_2(N_{RB}^{SB}(N_{RB}^{SB}+1)/2) \rceil = 5$ bits.

Configuration of Sub-Bands or RBs for PUCCH Transmission

Considering that a PDSCH or an MPDCCH transmission to a LC/CE UE that requires CE is in sub-bands of 6 RBs, at most $\lfloor M_{RB}^{DL}/6 \rfloor$ LC/CE UEs can be scheduled respective PDSCHs in a same set of SFs. Therefore, for a maximum DL system BW of $M_{RB}^{DL}=100$ RBs, at most 16 LC/CE UEs need to transmit HARQ-ACK information in a PUCCH in response to respective PDSCH or MPDCCH receptions in a same set of SFs. As LC/CE UE 114 receives only one data TB in a PDSCH, LC/CE UE 114 uses PUCCH Format 1a to transmit respective HARQ-ACK information (see also REF 1). Since a multiplexing capacity for PUCCH Format 1a in 1 RB is typically larger than 16 (see also REF 1), LC/CE UEs can be configured a same RB for transmission of HARQ-ACK information in a PUCCH. Different RBs for PUCCH transmission in a same SF can be configured to LC/CE UEs requiring different CE levels due to respective path-loss differences in order to avoid near-far effects causing eNB 102 to be unable to detect a weaker signal due to presence of a stronger signal. A configuration of different RBs for PUCCH transmission corresponding to different CE levels can be by separate configuration per CE level of a corresponding PUCCH resource offset (see also REF 1 and REF 3).

A configuration of RBs for repetitions of a PUCCH transmission for each CE level supported by eNB 102 can be informed by respective PUCCH resource offsets per CE level in a SIB as the RB can be common for all LC/CE UEs having a same CE level. The RBs can be restricted to be symmetric relative to the two sides of an UL system BW. For repetitions of a PUCCH transmission in 2 RBs, wherein the first RB has index i and the second RB has index $M_{RB}^{UL}-i-1$, where $0 \le i < \lfloor M_{RB}^{UL}/2 \rfloor$, only the index i needs to be signaled and this can be done with $\lceil \log_2(\lfloor M_{RB}^{UL}/2 \rfloor) \rceil$ bits. A RB where LC/CE UE 114 transmits first $R_{RB}^{PUCCH}$ repetitions of a PUCCH transmission can either be the RB with the lowest index, or the RB index can be included in the SIB for a respective PUCCH repetition level (CE level), or the RB index can be determined according to the CE level wherein, for example, a lower RB index, such as RB index i, is first used for $R_{RB}^{PUCCH}$ repetitions of a PUCCH transmission for a first CE level and a higher RB index, such as RB index $M_{RB}^{UL}-i-1$, is first used for $N_{RB}^{PUCCH}$ repetitions of a PUCCH transmission for a second CE level.

Figure 13:
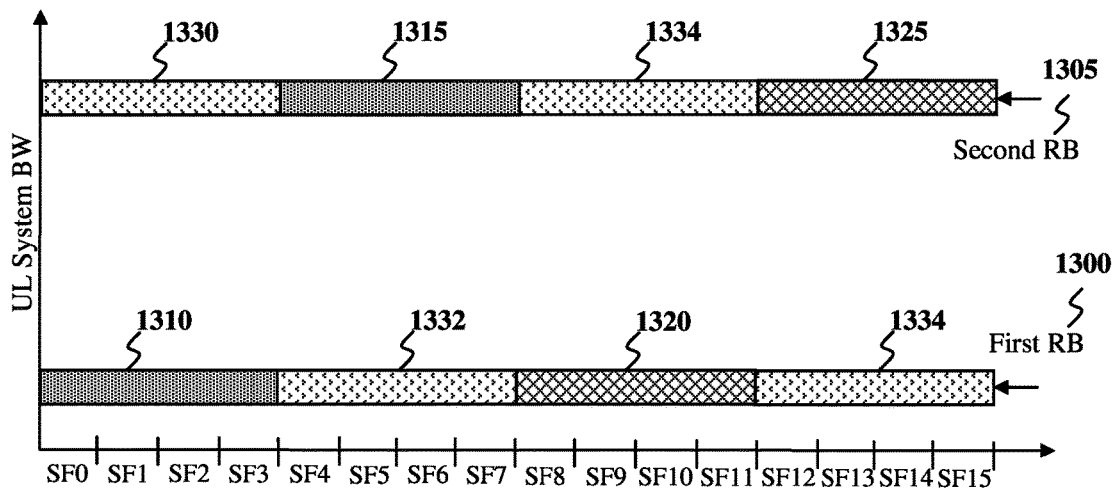
FIG. 13 illustrates RBs for repetitions of a PUCCH transmission according to a first CE level and according to a second CE level according to this disclosure.

FIG. 13 illustrates RBs for repetitions of a PUCCH transmission according to a first CE level and according to a second CE level according to this disclosure.

PUCCH transmissions in a RB pair are supported for two different CE levels in a first RB 1300 and in a second RB 1305. A first LC/CE UE operating with a first CE level transmits 4 repetitions of a PUCCH in SFs 0, 1, 2, and 3 in the first RB 1310 and transmits 4 repetitions of the PUCCH in SFs 4, 5, 6, and 7 in the second RB 1315 for a total of 8 repetitions for the PUCCH transmission. A third LC/CE UE also operating with the first CE level transmits 4 repetitions of a PUCCH in SFs 8, 9, 10, and 11 in the first RB 1320 and transmits 4 repetitions of the PUCCH in SFs 12, 13, 14, and 15 in the second RB 1325 for a total of 8 repetitions for the PUCCH transmission. A second LC/CE UE operating with a second CE level transmits 4 repetitions of a PUCCH in SFs 0, 1, 2, and 3 in the second RB 1330, transmits 4 repetitions of the PUCCH in SFs 4, 5, 6, and 7 in the first RB 1332, transmits 4 repetitions of a PUCCH in SFs 8, 9, 10, and 11 in the second RB 1334, and transmits 4 repetitions of the PUCCH in SFs 12, 13, 14, and 15 in the first RB 1336 for a total of 16 repetitions for the PUCCH transmission. A switching period for re-tuning between RBs for repetitions of a PUCCH transmission is not shown for brevity.

One advantage of the structure in FIG. 13, where a number of consecutive repetitions per RB for a PUCCH transmission is the same regardless of the total number of repetitions, is that this structure simplifies multiplexing in a same RB and in different SFs of PUCCHs for different CE levels (different total number of repetitions) or even of different UL channels (when $N_{RB}^{PUSCH}=N_{RB}^{PUCCH}$) for same or different CE levels. A same structure can be used for repetitions of DL channel transmission where a sub-band instead of a RB applies (and $R_{SB}^{PDSCH}=R_{SB}^{M-PDCCH}$). A same RB hopping pattern/interval or a same sub-band hopping pattern/interval can also apply for different UL channels or DL channels, respectively, or for different CE levels. Support of different CE levels for different LC/CE UEs or for different channels can be achieved through a different respective total number of repetitions. The values of $R_{SB}^{PDSCH}$, $R_{SB}^{M-PDCCH}$, $R_{RB}^{PUSCH}$, and $R_{RB}^{PUCCH}$ can be configured to LC/CE UE 114 either by RRC or by a SIB from eNB 102 or be predefined in the system operation.

After LC/CE UE 114 determines RBs for repetitions of a PUCCH transmission, LC/CE UE 114 needs to determine a PUCCH resource in the RBs. A differentiating factor among LC/CE UEs transmitting PUCCH in same RBs in same SFs is the first sub-band or a last sub-band of an associated MPDCCH reception. A PUCCH resource in a RB can then be determined as $N_{PUCCH}=n_{SB,0}+N_{offset}$, where $N_{offset}$ is a PUCCH resource offset and is configured by higher layer signaling for a respective CE level and $n_{SB,0}$ is the sub-band index either for a first or for a last repetition of an associated MPDCCH transmission for SPS release or $n_{SB,0}$ is the sub-band index either for a first repetition or for last repetition of the associated PDSCH transmission. A PUCCH resource can be mapped to a cyclic shift and an orthogonal covering code that are used for a PUCCH Format 1a transmission as described in REF 1 and REF 3.

Figure 14:
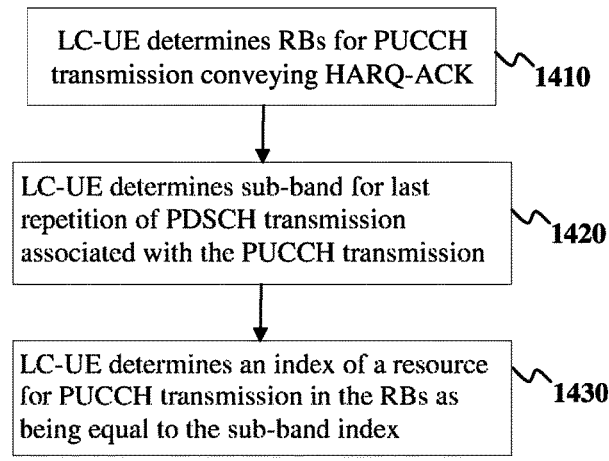
FIG. 14 illustrates a method for a LC/CE UE operating with CE to determine a PUCCH resource for a transmission of HARQ-ACK information according to this disclosure.

FIG. 14 illustrates a method for a LC/CE UE operating with CE to determine a PUCCH resource for a transmission of HARQ-ACK information according to this disclosure.

LC/CE UE 114 first determines RBs for a PUCCH transmission conveying HARQ-ACK information 1410, for example as described in FIG. 13. Subsequently, LC/CE UE 114 determines a sub-band conveying the last repetition of an MPDCCH transmission associated with the HARQ-ACK information 1420. Finally, LC/CE UE 114 determines an index of a resource for a PUCCH transmission in the RBs 1430 wherein the index is equal to the index of the sub-band. The order of the steps 1410, 1420, and 1430 can be interchanged but step 1420 precedes step 1430.

To avoid BW fragmentation, it is preferable to share a RB pair, in different SFs, among PUCCH Format 1a transmissions corresponding to two CE levels. As MPDCCH/PDSCH transmissions are typically with repetitions when a respective PUCCH Format 1a transmission is with repetitions, due to the typically better link budget for PUCCH Format 1a relative to MPDCCH, PDSCH, or PUSCH, and as PUCCH Format 1a transmissions from all UEs having a same last SF for respective PDSCH transmissions can be multiplexed in a same RB, the same RB can be used for first repetitions of a PUCCH Format 1a transmission from all UEs receiving a last PDSCH repetition in a same last SF and transmitting PUCCH Format 1a with a same number of repetitions.

A RB for first repetitions of a PUCCH Format 1a transmission is the one indicated by the CE level specific PUCCH resource offset. For a total of $M_{RB}^{UL}$ NBs, when eNB 102 configures to LC/CE UE 114 RB i, $0 \leq i \leq \lceil M_{RB}^{UL}/2 \rceil - 1$, then RB $M_{RB}^{UL}-i-1$ is used for frequency hopping of the PUCCH Format 1a transmission after the first repetitions. When a same PUCCH resource offset $N_{offset}$ is indicated for two CE levels corresponding to two respective PUCCH Format 1a repetition numbers, a RB for first PUCCH Format 1a repetitions for the second CE level is RB $M_{RB}^{UL}-i-1$ where a same frequency hopping interval is used for both CE levels. This enables using a same RB pair to time-division multiplex PUCCH Format 1a transmissions for the two CE levels. This also enables using same RB pairs to time-division multiplex repetitions of PDSCH transmissions with different repetition numbers. For example, using RB indexing within a sub-band and not across the entire UL system BW, when PUCCH Format 1a repetitions for the smaller number of repetitions are in RB j of sub-band i, PUCCH Format 1a repetitions for the larger number of repetitions are in RB j of sub-band $N_{SB}^{UL}-i-1$.

Therefore, when higher layer signaling in a SIB indicates a sub-band with index i, $0 \leq i \leq \lceil N_{SB}^{UL}/2 \rceil - 1$, for PUCCH Format 1a transmission, the two sub-bands for frequency hopping are the ones with indexes i and $N_{SB}^{UL}-i$. When higher layer signaling in a SIB indicates a same RB in a sub-band with index i, $0 \leq i \leq \lceil N_{SB}^{UL}/2 \rceil - 1$, for PUCCH Format 1a transmission with for two CE levels, a first repetition for a PUCCH Format 1a transmission with a first CE level is in sub-band with index i and a first repetition for a PUCCH Format 1a transmission with a second CE level is in sub-band with index $M_{SB}^{UL}-i-1$; otherwise, the first repetition is always in sub-band with index i.

Multiplexing Repetitions for Transmission of Channels with Frequency Hopping and Repetitions for Transmission of Channels without Frequency Hopping in Same Frequency Resources A transmission of a DL channel (MPDCCH, PDSCH) or of an UL channel (PUCCH, PUSCH) can also be localized in a same sub-band or RB instead of using frequency hopping among sub-bands or RBs, respectively. For example, based on a sub-band CSI report from LC/CE UE 114, when available, eNB 102 can determine that LC/CE UE 114 experiences better SINR in a first sub-band than in a second sub-band and then eNB 102 can configure LC/CE UE 114 to receive repetitions of a PDSCH transmission only in the first sub-band (no frequency hopping across sub-bands) instead of both in the first and second sub-bands using frequency (sub-band) hopping. For example, based on a SINR estimate obtained from a DMRS when LC/CE UE 114 transmits repetitions of a PUSCH in a first RB and in a second RB using frequency (RB) hopping, eNB 102 can determine that LC/CE UE 114 experiences better SINR in the second RB than in the first RB and then configure LC/CE UE 114 to transmit repetitions of a PUSCH transmission only in the second RB.

In order to enable multiplexing of repetitions for a DL channel or an UL channel transmission in a single sub-band or in a single RB, respectively, with repetitions for a DL channel or an UL channel transmission in multiple sub-bands or multiple RBs that include the single sub-band or the single RB, respectively, this disclosure provides for LC/CE UE 114 to be configured for intermittent reception of repetitions for a DL channel transmission or intermittent transmission of repetitions for an UL channel transmission.

Figure 15:
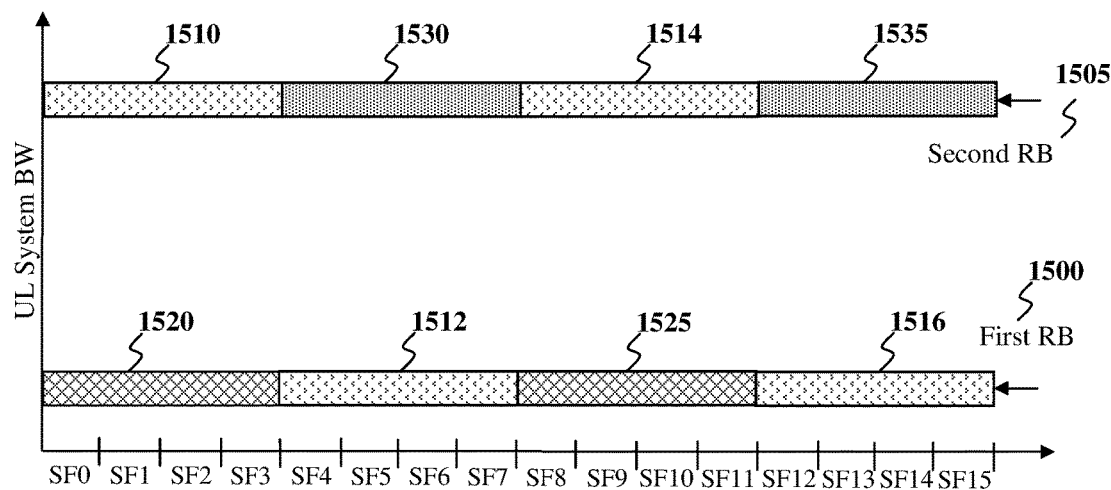
FIG. 15 illustrates multiplexing for repetitions of PUSCH transmissions, with and without frequency hopping, over 2 RBs according to this disclosure.

FIG. 15 illustrates multiplexing of repetitions for PUSCH transmissions, with and without frequency hopping, over 2 RBs according to this disclosure.

A first LC/CE UE, a second LC/CE UE, and a third LC UE are configured repetitions for respective PUSCH transmissions in a first RB 1500 and in a second RB 1505. The first LC/CE UE is configured to transmit 16 repetitions, using frequency hopping between the first RB and the second RB, in first four SFs 1510, in second four SFs 1512, in third four SFs 1514, and in fourth four SFs 1516. The second LC/CE UE is configured to transmit 8 repetitions only in the first RB in first four SFs 1520 and in second four SFs 1525. The second UE suspends repetitions of the PUSCH transmission in the second four SFs in the first RB. The third LC/CE UE is configured to transmit 8 repetitions only in the second RB in second four SFs 1530 and in fourth four SFs 1535. The third UE suspends repetitions of the PUSCH transmission in the first four SFs and in the third four SFs in the second RB.

Therefore, for a channel transmission with R repetitions, a number of X repetitions are transmitted in a same sub-band or in same one or more RBs, and next X repetitions are transmitted in a different sub-band or in different one or more RBs, respectively. For a channel transmission, a configuration of X can be per number R of repetitions or can be predetermined in the system operation. The configuration can be, for example, by eNB 102 signaling in a SIB two bits indicating four states ('00', '01', '10', '11'). A first state can indicate X=R (this disables frequency hopping and allows for frequency selective scheduling), a second state can indicate X=R/2, a third state can indicate X=R/4, and a fourth state can indicate X=R/8. Some states can remain without a mapping to an X value when such a mapping is not applicable (for example, when R=4, the value of X=R/8 is not applicable). For example, X=R/4 for R=8 and X=R/2 for R=4 in order to enable a LC/CE UE operating with a "small" CE level to simultaneously monitor different numbers of repetitions. For example, for a PDSCH transmission with repetitions, X=R to enable frequency-selective scheduling and X=R/2 otherwise when eNB 102 supports only one CE level. A configurable value for X per CE level can enable eNB 102 to fully control, according to the eNB's scheduling strategy and supported CE levels, tradeoffs associated with multiplexing channel transmissions with different repetition numbers, transmission latency due to retuning, and number of required repetitions for different CE levels.

Various embodiments of this disclosure provide combining repetitions for an MPDCCH, PDSCH, PUSCH, or PUCCH transmission.

Repetitions for an MPDCCH, PDSCH, PUSCH, or PUCCH transmission need to provide improved respective reception reliability especially for PUSCH or PUCCH transmission as this can affect a required number of repetitions and power consumption for LC/CE UE 114, while also enabling simple receiver architecture especially for MPDCCH or PDSCH reception at LC/CE UE 114 as this can affect a cost for LC/CE UE 114. For brevity, PDSCH transmission is subsequently considered but same arguments apply for an MPDCCH, PUSCH, or PUCCH transmission.

PDSCH reception reliability can be improved by using different redundancy versions (RVs) among repetitions of a PDSCH transmission in successive SFs where the repetitions are transmitted. This is because using different RVs improves a diversity of a data TB as different RVs correspond to different versions of the encoded data TB and contain different combinations of systematic and forward-error correcting bits (parity bits). For example, using different RVs among repetitions of a PUSCH transmission in successive SFs is considered for PUSCH repetitions (see also REF 3) where, for four RVs, a pattern of 0, 2, 3, 1 applies among successive repetitions.

One disadvantage from using successive (different) RVs in respective successive repetitions of a PDSCH transmission relates to LC/CE UE 114 receiver implementation required for combining the repetitions of the PDSCH transmission. Due to the use of different RVs in successive SFs, combining of data symbols needs to occur after demodulation and prior to decoding (at a log-likelihood ratio (LLR) symbol level). For a LC/CE UE 114 receiver implementation that avoids buffering symbols prior to demodulation over a number of SFs in order to reduce cost, demodulation of data symbols in a SF needs to be based only on a channel estimate obtained from a RS, such as a CRS or a DMRS, received in the respective SF and in earlier SFs from $R_{SB}^{PDSCH}$ corresponding to consecutive repetitions in a same sub-band. An inability to combine RS from up to $R_{SB}^{PDSCH}$ successive SFs in a sub-band for demodulating data symbols limits the accuracy of a channel estimate used for the demodulation.

Figure 16:
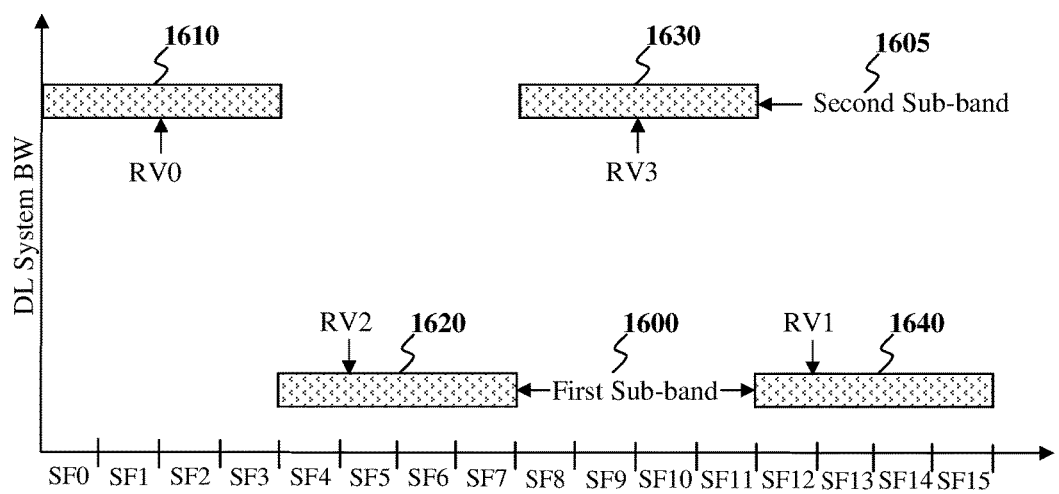
FIG. 16 illustrates a first realization for a use of RVs for repetitions of a PDSCH transmission in a sub-band and in different sub-bands according to this disclosure.

To avoid the disadvantage from using successive RVs in respective successive repetitions of a PDSCH transmission, in a first realization a same RV can be used for successive repetitions of the PDSCH transmission in a sub-band and different RVs can be used for repetitions of the PDSCH transmission in different sub-bands (as in FIG. 16). In a second realization a same RV can be used for a number of successive repetitions of a PDSCH transmission in a sub-band and a different RV can be used for a next number of successive repetitions of the PDSCH transmission in the sub-band (as in FIG. 17).

Using a same RV in $R_{SB}^{PDSCH}$ successive SFs in a sub-band enables combining data symbols prior to demodulation (I/Q-level combining) over a number of SFs without a need to buffer data symbols over the number of SFs prior to demodulation, and also enables combining RS symbols over the number of SFs for improved accuracy of a channel estimate used for demodulation of data symbols (a same scrambling sequence is also assumed to apply over the number of SFs where same RV is used in order to enable I/Q-level symbol combining). This improved accuracy can in turn provide significant gains in a reception reliability of a data TB, particularly considering a low SINR that is experienced by LC/CE UE 114 when LC/CE UE 114 requires operation with CE, and a reduction in a number of required repetitions to achieve a target reception reliability for the data TB.

FIG. 16 illustrates a first realization for a use of RVs for repetitions of a PDSCH transmission in a sub-band and in different sub-bands according to this disclosure.

LC/CE UE 114 receives repetitions of a PDSCH transmission over a first sub-band 1600 and over a second sub-band 1605. In a first realization, there are four successive repetitions of a PDSCH transmission in respective SFs in one sub-band, such as a second sub-band, 1610 followed by another four successive repetitions of the PDSCH transmission in respective SFs in another sub-band, such as a first sub-band, 1620 followed by another four successive repetitions of the PDSCH transmission in respective SFs in the second sub-band, 1630 and finally followed by another four successive repetitions of the PDSCH transmission in respective SFs in the first sub-band 1640. A same RV, RV0, and a same scrambling sequence is used for each of the first four repetitions 1610 to enable RS combining or I/Q symbol data combining, such as averaging, over all respective SFs prior to demodulation. Subsequently, demodulation can be performed on the combined data using a channel estimate obtained from the combined RS. Similar, same RVs, such as RV2, RV3, and RV1, and respective same scrambling sequences can be used in each of the second 1620, third 1630, or fourth 1640 four repetitions, respectively, and further processing of the received repetitions can be as for the first four repetitions. After data demodulation for each quadruplet of repetitions, demodulated data can be combined prior to decoding and then be decoded by LC/CE UE 114.

Figure 17:
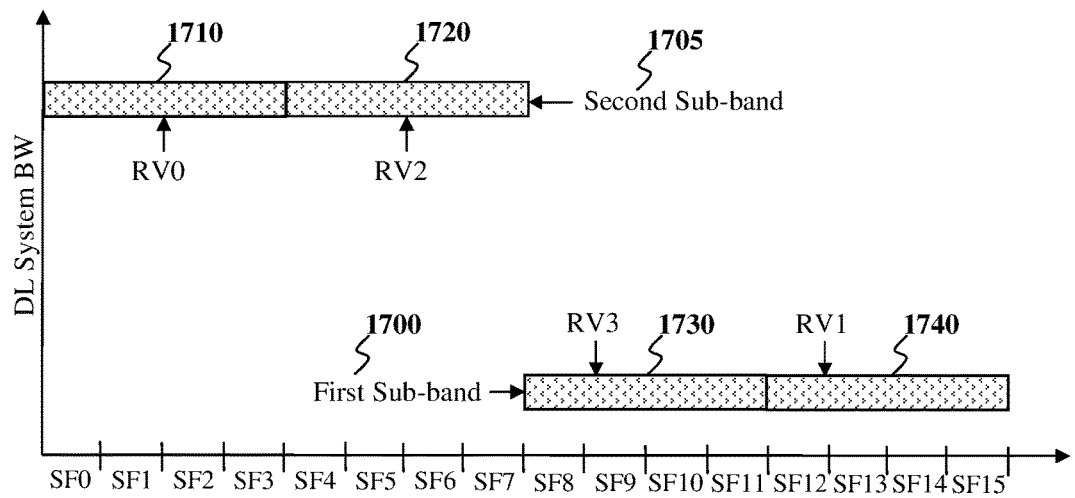
FIG. 17 illustrates a first realization for a use of RVs for repetitions of a PDSCH transmission in a sub-band and in different sub-bands according to this disclosure.

FIG. 17 illustrates a second realization for use of RVs for repetitions of a PDSCH transmission in a sub-band and in different sub-bands according to this disclosure.

LC/CE UE 114 receives repetitions of a PDSCH transmission over a first sub-band 1700 and over a second sub-band 1705. In a second realization, there are eight successive repetitions of a PDSCH transmission in respective SFs in one sub-band, such as a second sub-band, followed by another eight successive repetitions of the PDSCH transmission in respective SFs in another sub-band, such as a first sub-band. A same RV, RV0, and a first scrambling sequence are used in each of the first four repetitions 1710 and a same RV, RV2, and a second scrambling sequence are used in each of the second four repetitions 1720 in the second sub-band to enable data combining, such as averaging, over respective four SFs for a same RV prior to demodulation. Similar, a same RV, RV3, and a third scrambling sequence are used in each of the third four repetitions 1730 and a same RV, RV1, and a fourth scrambling sequence are used in each of the fourth four repetitions 1740 in the first sub-band to enable data combining prior to demodulation (I/Q data symbol combining) over respective four SFs for a same RV prior to demodulation. Subsequently, demodulation can be performed on the combined data for a same RV per quadruple of SFs using a channel estimate obtained from the combined RS over a number of SFs such as 4 SFs. After data demodulation for each quadruplet of four repetitions, the demodulated data can be combined prior to decoding and then be decoded.

One advantage of the second realization over the first realization is that only a single re-tuning to a different sub-band is needed, instead of 3 re-tunings to different sub-bands, for a PDSCH transmission with 16 repetitions. Either of the two realizations can also apply for MPDCCH transmissions, and for PUSCH or PUCCH transmissions. Using a same RV over four repetitions provides a balance between gains from improved channel estimation due to I/Q symbol level combining prior to demodulation for the data symbols and gains from coding diversity due to a use of different RVs across repetitions. A number of repetitions that use a same RV can be configured to a LC/CE UE by an eNB, or can be determined in the system operation, for example as being fixed to a value of four, or as being one-half of a total number of successive repetitions in the sub-band.

Various embodiments of this disclosure provide time-frequency sub-band hopping or RB hopping.

Prior to LC/CE UE 114 being configured by eNB 102 sub-bands for MPDCCH or PDSCH reception (or sub-bands/RBs for PUCCH or PUSCH transmission), LC/CE UE 114 needs to determine such sub-bands by other means. For example, when CSS is not supported for MPDCCH transmissions scheduling SIB-1 transmission (SIB-1 is a first SIB from multiple SIBs) and sub-bands for SIB-1 transmission are not signaled in a MIB, LC/CE UE 114 needs to implicitly determine such sub-bands and respective SFs in order to receive a PDSCH conveying the SIB-1.

Implicit determination of sub-bands and SFs for MPDCCH or PDSCH reception can be based on parameters such as the DL system BW that LC/CE UE 114 can obtain from a MIB or an identity (PCID) of eNB 102 that LC/CE UE 114 can determine after detection PSS/SSS (see also REF 1). As a number of PCIDs can be large, such as 504, and a number of sub-bands can be small, such as 8, it is unavoidable that same sub-bands for a MPDCCH CSS or for a PDSCH conveying, for example, a SIB-1 are used by eNBs with different PCIDs. For example, for 2 sub-bands allocated to MPDCCH CSS or to PDSCH out of a total of 8 sub-bands, there are $$\binom{8}{2} = 28$$

possible combinations that need to be shared among 504 PCIDs. Therefore, without specific network planning to avoid having PCIDs from neighboring eNBs mapped to same sub-bands or SFs, neighboring eNBs can use same sub-bands or SFs to transmit MPDCCH or PDSCH when the sub-bands or the SFs are not explicitly signaled but are instead determined as a function of the PCID. Such sub-band collisions among neighboring eNBs can have a detrimental interfering effect when LC/CE UE 114 is located near a neighboring eNB.

To minimize collisions of sub-bands (or RBs) or SFs used for a CSS or for PDSCH transmissions, sub-band hopping in the time domain or randomization of SFs used for a CSS of for PDSCH transmissions can apply. For example, a function having as arguments a SFN of a frame, a SF index within a frame, a PCID, and a DL system BW, can be used to determine a location of a sub-band in a SF or to determine the SFs for a SIB-1 transmission.

Figure 18:
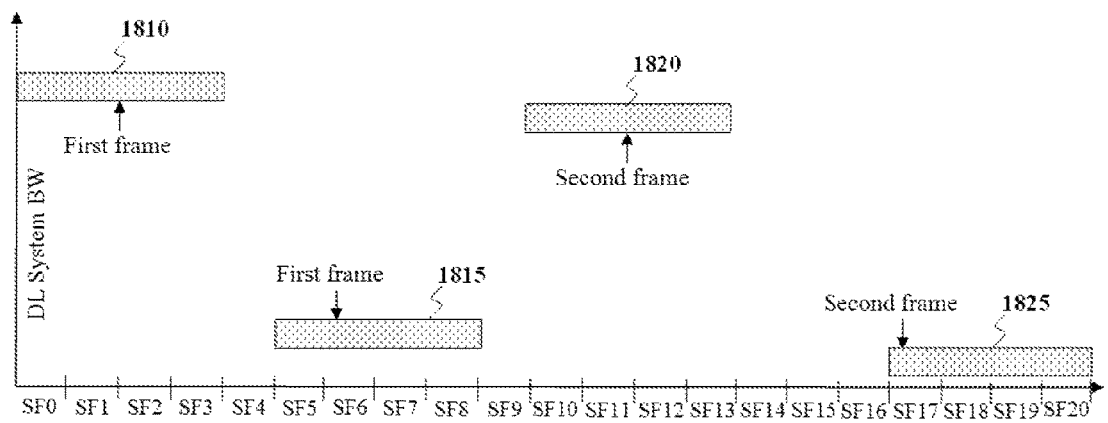
FIG. 18 illustrates a use of hopping to determine sub-bands for a PDSCH transmission according to this disclosure.

FIG. 18 illustrates a use of hopping to determine sub-bands for a PDSCH transmission according to this disclosure.

After PSS/SSS and MIB detection, LC/CE UE 114 determines a PCID for eNB 102, a DL system BW, a SFN, and a SF index. Based on this information, LC/CE UE 114 determines location in a DL system BW for a sub-band 1810, 1815 that eNB 102 uses to transmit a PDSCH conveying, for example, a SIB-1. At a next frame and for a same SF index, a location for the sub-band that eNB 102 uses to transmit the PDSCH is different 1820, 1825.

Further, based on a PCID, only a subset of SFs per frame or a subset of frames can be used for repetitions of a channel transmission such as a SIB-1 transmission. The subset of SFs can additionally vary across frames. For example, in a FDD system, only a first (SF0), fifth (SF4), sixth (SF5), and tenth (SF9) SFs per frame can be guaranteed to always support repetitions of a SIB-1 transmission. Repetitions of a SIB-1 transmission can be, for example, in two of the four SFs per frame where, for example, the two SFs can be contiguous in time resulting to the pairs (SF9, SF0) and (SF4, SF5). First two repetitions of a SIB-1 transmission can be in (SF9, SF0), second two repetitions of a SIB-1 transmission can be in (SF4, SF5), third two repetitions of a SIB-1 transmission can be in (SF4, SF5), fourth two repetitions of a SIB-1 transmission can be in (SF9, SF0), and so on. The hopping among SF pairs can be based on a pseudorandom pattern having as components the PCID, the SFN, and the 2 pairs of SFs. In another example, all SFs per frame can be used for repetitions of a SIB-1 transmission and frames with repetitions of the SIB-1 transmission can have a pseudorandom pattern and an average periodicity or be predetermined based on the PCID. For example, a first predetermined set of SFs can be used to transmit SIB-1 for a first set of PCIDs, such as odd PCIDs, and a second predetermined set of SFs can be used to transmit SIB-1 for a first set of PCIDs, such as even PCIDs. In another example, repetitions of a SIB-1 transmission can be based on a pseudorandom pattern that limits the repetitions both in a subset of available SFs per frame and in a subset of available frames per system frame number cycle of 1024 frames. The pseudorandom pattern is known to LC/CE UE 114 in advance. A joint time-frequency hopping pattern can also be defined having as parameters the PCID, the SFN, the number of sub-bands available for SIB-1 transmission, and the 2 pairs of SFs.

Figure 19:
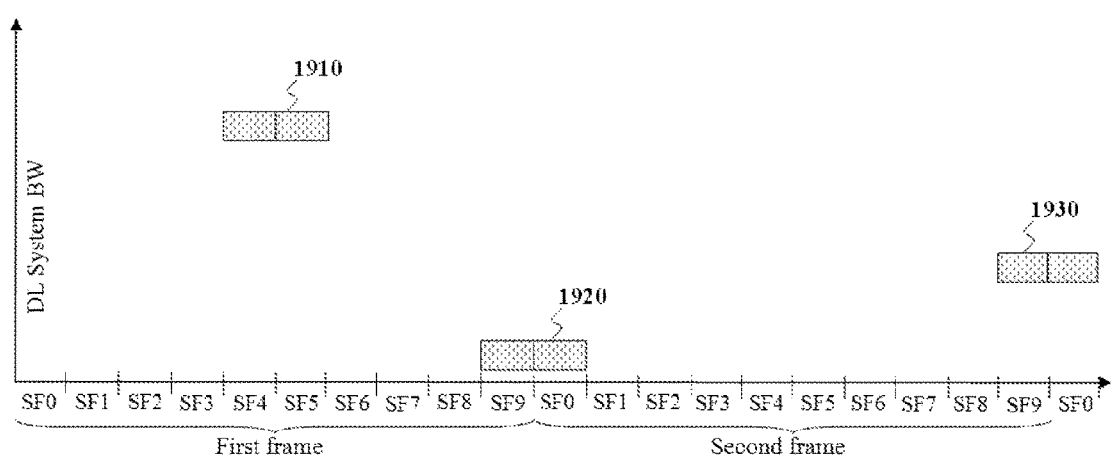
FIG. 19 illustrates a use of a pseudorandom subset of SFs per frame for repetitions of a channel transmission according to this disclosure.

FIG. 19 illustrates a use of a pseudorandom subset of SFs per frame for repetitions of a channel transmission according to this disclosure.

After PSS/SSS and MIB detection, LC/CE UE 114 determines a PCID for eNB 102, a DL system BW, a SFN, and a SF index. Based on this information and on predetermined knowledge of SFs per frame that support repetition of a transmission, such as a SIB-1 transmission, and of a pseudorandom pattern, LC/CE UE 114 determines location in a DL system BW for a sub-band and two SFs in a first frame for two repetitions of the SIB-1 transmission 1910, determines location in a DL system BW for a sub-band and two SFs in a first frame and a second frame for two repetitions of the SIB-1 transmission 1920, and determines location in a DL system BW for a sub-band and two SFs in a second frame and a third frame for two repetitions of the SIB-1 transmission 1930. Although repetitions of the SIB-1 transmission are shown to occur in consecutive frames, they can occur intermittently across frames according to a predetermined pattern.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim. Use of any other term, including without limitation "mechanism," "module," "device," "unit," "component," "element," "member," "apparatus," "machine," "system," "processor," or "controller," within a claim is understood by the applicants to refer to structures known to those skilled in the relevant art and is not intended to invoke 35 U.S.C. § 112(f).

Although the present disclosure has been described with example embodiments, various changes and modifications can be suggested to one skilled in the art. It is intended that the present disclosure encompass such changes and modifications that fall within the scope of the appended claims.

What is claimed is:

1. An apparatus of a base station comprising:
a transceiver; and
at least one processor operably coupled to the transceiver;
wherein the at least one processor is configured to control the transceiver to transmit or receive a signal, by using a sub-band (SB) from N SBs in a transmission bandwidth including an even number of M resource blocks (RBs) indexed from 0 to M−1 in an ascending order,
wherein $N=\lfloor M/6 \rfloor$,
wherein each of the N SBs includes six non-overlapping physical RBs, and
wherein a first of RBs included in the N SBs is identified based on the M and a number of RBs included the N SBs.

2. The apparatus of claim 1, wherein the first of the RBs included in the N SBs is identified as $(M-\lfloor M/6 \rfloor \cdot 6)/2$.

3. The apparatus of claim 2,
wherein the N SBs are numbered from 0 to N−1 in order of increasing physical RB number,
wherein a SB $n_{SB}$ of the N SBs is, among the M RBs, composed of physical RBs indexed based on:

$$6 \cdot n_{SB} + n_0 + n,$$

where, $n_{SB}=0, \ldots, N-1$, $n=0, 1, \ldots, 5$, $n_0$ represents an index of the first of the RBs included in the N SBs.

4. The apparatus of claim 1, wherein the at least one processor is further configured to control the transceiver to transmit information for configuring a number of SBs for machine type communication (MTC) physical DL control channel (PDCCH) (MPDCCH) or physical downlink shared channel (PDSCH) frequency hopping, and
wherein the number of the SBs is two or four.

5. The apparatus of claim 1, wherein the at least one processor is further configured to control the transceiver to transmit information for configuring a first SB for machine type communication (MTC) physical DL control channel (PDCCH) (MPDCCH) transmission in a first subframe of MPDCCH monitoring instances by a first higher layer signaling.

6. The apparatus of claim 5, wherein the at least one processor is further configured to control the transceiver to transmit downlink control information (DCI) based on the MPDCCH transmission, and
wherein the DCI includes information using $\lceil \log_2(N_{SB}) \rceil$ bits for indicating a first SB for physical downlink shared channel (PDSCH) transmission in a first subframe.

7. The apparatus of claim 6, wherein the at least one processor is further configured to control the transceiver to transmit information for configuring an offset between one SB and next SB for the MPDCCH transmission,
wherein $k_2=(k_1+O_{SB}) \bmod N_{SB}$ where $k_2$ is an index of a second SB for the MPDCCH transmission, $k_1$ is an index of the first SB for the MPDCCH transmission, $O_{SB}$ is the offset, and mod is a modulo operation, and wherein $n_2=(n_1+O_{SB})\bmod N_{SB}$, where $n_2$ indicates a second SB for the PDSCH transmission, $n_1$ indicates the first SB for the PDSCH transmission.

8. An apparatus of a user equipment (UE) comprising:
a transceiver; and
at least one processor operably coupled to the transceiver;
wherein the at least one processor is configured to control the transceiver to receive or transmit a signal, by using a sub-band (SB) from N SBs, in a transmission bandwidth including an even number of M resource blocks (RBs) indexed from 0 to M−1 in an ascending order,
wherein $N=\lfloor M/6 \rfloor$,
wherein each of the N SBs includes six non-overlapping physical RBs, and
wherein a first of RBs included in the N SBs is identified based on the M and a number of RBs included the N SBs.

9. The apparatus of claim 8, wherein the first of the RBs included in the N SBs is identified as $(M-\lfloor M/6 \rfloor \cdot 6)/2$.

10. The apparatus of claim 9,
wherein the N SBs are numbered from 0 to N−1 in order of increasing physical RB number,
wherein a SB $n_{SB}$ of the N SBs is, among the M RBs, composed of physical RBs indexed based on:

$$6 \cdot n_{SB}+n_0+n,$$

where, $n_{SB}=0, \ldots, N-1$, $n=0, 1, \ldots, 5$, $n_0$ represents an index of the first of the RBs included in the N SBs.

11. The apparatus of claim 8, wherein the at least one processor is further configured to control the transceiver to receive information for configuring a number of SBs for machine type communication (MTC) physical DL control channel (PDCCH) (MPDCCH) or physical downlink shared channel (PDSCH) frequency hopping, and
wherein the number of the SBs is two or four.

12. The apparatus of claim 8, wherein the at least one processor is further configured to control the transceiver to receive information for configuring a first SB for machine type communication (MTC) physical DL control channel (PDCCH) (MPDCCH) transmission in a first subframe of MPDCCH monitoring instances by a first higher layer signaling.

13. The apparatus of claim 12, wherein the at least one processor is further configured to control the transceiver to transmit downlink control information (DCI) based on the MPDCCH transmission, and
wherein the DCI includes information using $\lceil \log_2 (N_{SB}) \rceil$ bits for indicating a first SB for physical downlink shared channel (PDSCH) transmission in a first subframe.

14. The apparatus of claim 13, wherein the at least one processor is further configured to control the transceiver to receive information for configuring an offset between one SB and next SB for the MPDCCH transmission,
wherein $k_2=(k_1+O_{SB})\bmod N_{SB}$ where $k_2$ is an index of a second SB for the MPDCCH transmission, $k_1$ is an index of the first SB for the MPDCCH transmission, $O_{SB}$ is the offset, and mod is a modulo operation, and
wherein $n_2=(n_1+O_{SB})\bmod N_{SB}$, where $n_2$ indicates a second SB for the PDSCH transmission, $n_1$ indicates the first SB for the PDSCH transmission.

15. A method for operating a base station comprising:
transmitting or receiving a signal, by using a sub-band (SB) from N SBs in a transmission bandwidth including an even number of M resource blocks (RBs) indexed from 0 to M−1 in an ascending order,
wherein $N=\lfloor M/6 \rfloor$,
wherein each of the N SBs includes six non-overlapping physical RBs, and
wherein a first of RBs included in the N SBs is identified based on the M and a number of RBs included the N SBs.

16. The method of claim 15, wherein the first of the RBs included in the N SBs is identified as $(M-\lfloor M/6 \rfloor \cdot 6)/2$.

17. The method of claim 16,
wherein the N SBs are numbered from 0 to N−1 in order of increasing physical RB number,
wherein a SB $n_{SB}$ of the N SBs is, among the M RBs, composed of physical RBs indexed based on:

$$6 \cdot n_{SB}+n_0+n,$$

where, $n_{SB}=0, \ldots, N-1$, $n=0, 1, \ldots, 5$, $n_0$ represents an index of the first of the RBs included in the N SBs.

18. The method of claim 15, further comprising:
transmitting information for configuring a number of SBs for machine type communication (MTC) physical DL control channel (PDCCH) (MPDCCH) or physical downlink shared channel (PDSCH) frequency hopping, and
wherein the number of the SBs is two or four.

19. The method of claim 15, further comprising:
transmitting information for configuring a first SB for machine type communication (MTC) physical DL control channel (PDCCH) (MPDCCH) transmission in a first subframe of MPDCCH monitoring instances by a first higher layer signaling.

20. The method of claim 19, further comprising:
transmitting downlink control information (DCI) based on the MPDCCH transmission, and
wherein the DCI includes information using $\lceil \log_2 (N_{SB}) \rceil$ bits for indicating a first SB for physical downlink shared channel (PDSCH) transmission in a first subframe.

21. The method of claim 20, further comprising:
transmitting information for configuring an offset between one SB and next SB for the MPDCCH transmission,
wherein $k_2=(k_1+O_{SB})\bmod N_{SB}$ where $k_2$ is an index of a second SB for the MPDCCH transmission, $k_1$ is an index of the first SB for the MPDCCH transmission, $O_{SB}$ is the offset, and mod is a modulo operation, and
wherein $n_2=(n_1+O_{SB})\bmod N_{SB}$, where $n_2$ indicates a second SB for the PDSCH transmission, $n_1$ indicates the first SB for the PDSCH transmission.

22. A method for operating a user equipment (UE) comprising:
receiving or transmitting a signal, by using a sub-band (SB) from N SBs, in a transmission bandwidth including an even number of M resource blocks (RBs) indexed from 0 to M−1 in an ascending order,
wherein $N=\lfloor M/6 \rfloor$,
wherein each of the N SBs includes six non-overlapping physical RBs, and
wherein a first of RBs included in the N SBs is identified based on the M and a number of RBs included the N SBs.

23. The method of claim 22, wherein the first of the RBs included in the N SBs is identified as $(M-\lfloor M/6 \rfloor \cdot 6)/2$.

24. The method of claim 23,
wherein the N SBs are numbered from 0 to N−1 in order of increasing physical RB number,
wherein a SB $n_{SB}$ of the N SBs is, among the M RBs, composed of physical RBs indexed based on:

$$6 \cdot n_{SB} + n_0 + n,$$

where, $n_{SB}=0, \ldots, N-1$, $n=0, 1, \ldots, 5$, $n_0$ represents an index of the first of the RBs included in the N SBs.

25. The method of claim 22, further comprising:
receiving information for configuring a number of SBs for machine type communication (MTC) physical DL control channel (PDCCH) (MPDCCH) or physical downlink shared channel (PDSCH) frequency hopping, and
wherein the number of the SBs is two or four.

26. The method of claim 22, further comprising:
receiving information for configuring a first SB for machine type communication (MTC) physical DL control channel (PDCCH) (MPDCCH) transmission in a first subframe of MPDCCH monitoring instances by a first higher layer signaling.

27. The method of claim 26, further comprising:
transmitting downlink control information (DCI) based on the MPDCCH transmission, and
wherein the DCI includes information using $\lceil \log_2 (N_{SB}) \rceil$ bits for indicating a first SB for physical downlink shared channel (PDSCH) transmission in a first subframe.

28. The method of claim 27, further comprising:
receiving information for configuring an offset between one SB and next SB for the MPDCCH transmission,
wherein $k_2=(k_1+O_{SB}) \bmod N_{SB}$ where $k_2$ is an index of a second SB for the MPDCCH transmission, $k_1$ is an index of the first SB for the MPDCCH transmission, $O_{SB}$ is the offset, and mod is a modulo operation, and
wherein $n_2=(n_1+O_{SB}) \bmod N_{SB}$, where $n_2$ indicates a second SB for the PDSCH transmission, $n_1$ indicates the first SB for the PDSCH transmission.

* * * * *